United States Patent [19]

Kimura

[11] Patent Number: 4,622,907
[45] Date of Patent: Nov. 18, 1986

[54] PROGRAMMING AND DISPLAY SYSTEMS FOR AN EMBROIDERY MACHINE

[75] Inventor: Jiro Kimura, Aichi, Japan

[73] Assignees: Ricoh Denshi Kogyo Co., Ltd., Tokyo; Nakanihon System Co., Ltd., Nagoya; Barudan Co., Ltd., Ichinomiya, all of Japan

[21] Appl. No.: 676,804

[22] Filed: Nov. 30, 1984

[30] Foreign Application Priority Data

Dec. 1, 1983 [JP] Japan .................. 58-227139

[51] Int. Cl.⁴ ............................................ D05B 21/00
[52] U.S. Cl. ................................ 112/121.12; 112/86; 112/103; 112/445; 112/454
[58] Field of Search ............ 112/121.12, 121.11, 112/445, 454, 103, 266.1, 262.3, 453, 102, 86, 78, 98; 364/470

[56] References Cited

U.S. PATENT DOCUMENTS

| | | | |
|---|---|---|---|
| 4,341,170 | 7/1982 | Beckerman | 112/158 E |
| 4,352,334 | 10/1982 | Childs | 112/266.1 |
| 4,373,459 | 2/1983 | Dunn | 112/158 E |
| 4,413,574 | 11/1983 | Hirota | 112/121.12 |
| 4,429,364 | 1/1984 | Maruyama et al. | 112/445 X |
| 4,446,520 | 5/1984 | Shigeta et al. | 112/121.12 X |
| 4,502,402 | 3/1985 | Kato | 112/445 |
| 4,520,745 | 6/1985 | Shinomiya et al. | 112/121.12 X |
| 4,557,207 | 12/1985 | Turner et al. | 112/121.12 X |

FOREIGN PATENT DOCUMENTS

| | | |
|---|---|---|
| 530956 | 8/1983 | Australia . |
| 2938294 | 4/1980 | Fed. Rep. of Germany . |
| 3102445 | 1/1982 | Fed. Rep. of Germany . |
| 3243313 | 11/1983 | Fed. Rep. of Germany . |
| 58-22090 | 2/1983 | Japan . |

Primary Examiner—Peter Nerbun
Attorney, Agent, or Firm—Oblon, Fisher, Spivak, McClelland & Maier

[57] ABSTRACT

An embroidery machine comprising: stitch forming means to form stitches on a fabric; fabric holding means to hold the fabric; driving means to regulate the relative position between the fabric holding means and the stitch forming means; pattern determining means having a display unit for two-dimensionally displaying a pattern and an input unit for feeding data of a pattern to be displayed on the display unit; and control means to control the operation of the driving means in accordance with a pattern produced by the pattern determining means and to control the operation of the stitch forming means in synchronism with the action of the driving means.

9 Claims, 29 Drawing Figures

PROGRAMMING AND DISPLAY SYSTEMS FOR AN EMBROIDERY MACHINE

BACKGROUND OF THE INVENTION

1. Field of the Invention

The present invention relates to an embroidery machine for stitching desired patterns on a fabric and more particularly to an embroidery machine capable of visually showing the resulting stitched patterns beforehand.

2. Description of the Prior Art

Various machines have been proposed to enhance the aesthetic value of fabrics by stitching patterns on fabrics. FIG. 1 is a schematic view showing the construction of a conventional pattern forming machine. In FIG. 1, indicated at A is an input unit through which the operator feeds desired patterns or the like to be formed on a fabric and at C is a control unit which reads a control procedure previously stored in a pattern memory unit D in accordance with the input signal fed thereto from the input unit A and provides control signals in accordance with the control procedure to a stitch forming unit E and to a driving unit F which changes the relative position between the stitch forming unit E and the fabric B. A machine of this kind has a fixed control procedure for each elementary pattern stored in the pattern memory unit D to enable the forming of known aesthetic elementary patterns, such as capital letters and Gothic letters, by the actions of the pattern forming unit E and the driving unit F. The operator is enable to select a desired elementary pattern among those stored elementary patterns and to stitch the selected elementary pattern on a fabric.

However, since the elementary patterns are defined uniquely by the memory unit D, the freedom of creating a pattern through the combination of those elementary patterns is likely to be restricted. Accordingly, conventional pattern forming machines of such a kind were devised to enable the creation of various patterns by making the size of the elementary patterns and the interval between the elementary patterns variable so that various different patterns can be formed.

Nevertheless, such conventional pattern forming machines have the following disadvantages. First, even though a pattern can optionally and freely be created, the created pattern needs to be converted into numerical codes or the like which are necessary for controlling the control unit C as the input unit A of the pattern forming machine comprises a keyboard or the like, notwithstanding the created pattern is a two-dimensional pattern imaged by the operator or drawn on paper. Secondary, the actions of the pattern forming machine responding to the input numerical codes and the resultant patterns forming on the fabric B are known only after the pattern forming machine has completed a series of actions.

Such disadvantages were enhanced in proportion to the expansion of the degree of freedom of pattern creation. Furthermore, the change of a pattern formed once on a fabric was liable to cause damages in the fabric. Accordingly, it has earnestly desired that a machine capable of providing a large degree of freedom for pattern forming and of accurately showing the resultant pattern before the pattern is formed actually on a fabric.

SUMMARY OF THE INVENTION

Accordingly, it is an object of the present invention to provide an embroidery machine capable of enabling the operator to perform free pattern creation while recognizing the corresponding stitched pattern to be formed on a fabric correctly from an image.

Another object of the present invention is to provide an embroidery machine capable of enabling the operator to create a pattern by recognizing the pattern on a two-dimensional display unit so that a desired pattern is formed simply on a fabric, of enabling quick and accurate embroidering regardless of the skill of the operator without failure owing to the previous recognition of the result of embroidering, of eliminating the time for test stitching which has been necessary and of eliminating the necessity of removing stitches once formed on a fabric for correction or modification which spoils the fabric.

An embroidery machine according to the present invention comprises, as shown in FIG. 2, a stitch forming means I which forms stitches on a fabric, a fabric holding means II for holding the fabric, a driving means III which changes the relative position between the stitch forming means I and the fabric holding means II, a pattern deciding means IV having a display unit IV-1 for two-dimensionally displaying a pattern and an input unit IV-2 for feeding a pattern to be displayed on the display unit IV-1 and a control means V which controls the driving means III for operation on the basis of the pattern produced by the pattern deciding means IV and drives the stitch forming means I in synchronism with the actions of the driving means III.

DESCRIPTION OF THE PREFERRED EMBODIMENT

A preferred embodiment of the present invention will be descrived hereinafter in connection with the acompanying drawings.

Figure 1:
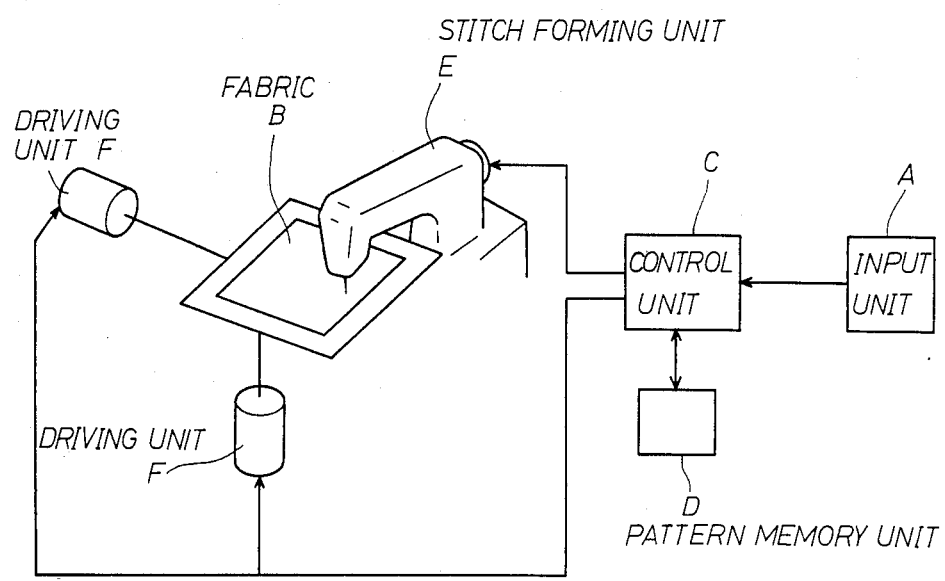
FIG. 1 is a block diagram of a conventional embroidery machine.
Figure 2:
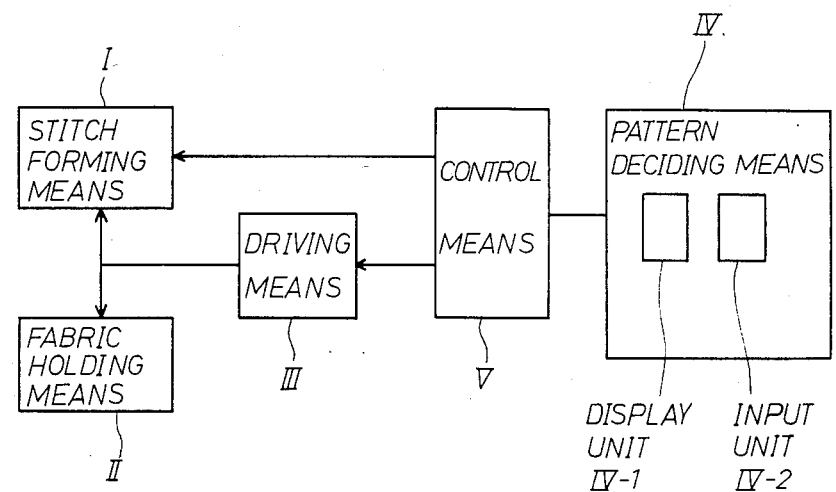
FIG. 2 is a block diagram showing the constitution of an embroidery machine according to the present invention.
Figure 3:
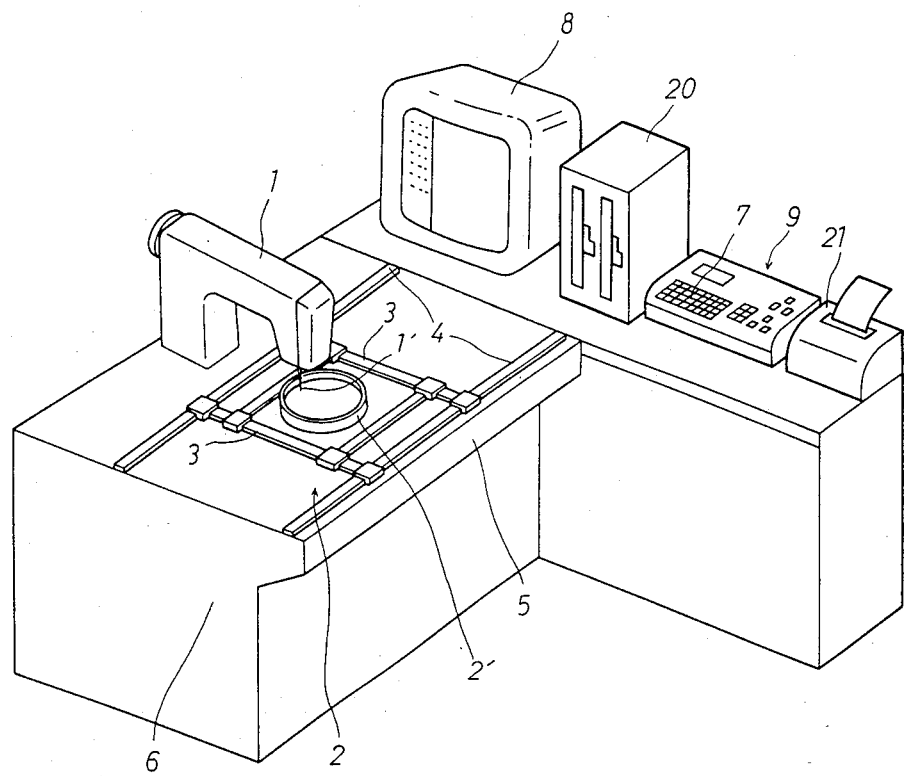
FIG. 3 is a schematic perspective view of a preferred embodiment of the present invention.

Referring to FIG. 3 showing the general constitution of a preferred embodiment of the present invention, there are shown a well-known sewing machine 1, i.e., a stitch forming means, having as well known a stitching needle 1', a shuttle, not shown, which cooperates with the stitching needle and a sewing motor, not shown; a fabric holding unit 2, i.e., a fabric holding means, which holds a fabric with embroidery hoops 2' and moves on rails 3 and 4; a sewing table 5 on which is provided with the rail 4 for guiding the movement of the fabric holding unit 2 over the sewing table 5; a driving unit 6 having a sewing motor 6a (designated simply as "s-motor" hereinafter) for driving the stitching needle 1', a stepping motor 6y (designated simply as "y-motor" hereinafter) for driving the fabric holding unit 2 for movement along the rail 3, a stepping motor 6x (designated simply as "x-motor" hereinafter) for driving the fabric holding unit 2 for movement along the rail 4, and rollers, wires and cams for converting the driving power (rotative power)of these motors into power for driving the stitching needle vertically and for driving the fabric holding unit linearly along the rails; a keyboard 7 of a microprocessor 9, i.e., and input unit, through which input control information of a created pattern is given; a cathode-ray tube 8 (abbreviated to "CRT" hereinafter), i.e., a two-dimensional display unit, for enabling the operator to recognize visually a pattern which is nearly the same a pattern created by operating the keyboard 7 and to be formed actually of a fabric, when the pattern is created, modified or corrected in accordance with the input information given by means of the keyboard 7; the microprocessor 9 which functions as a control means and a pattern deciding means which provide control signals for controlling those three motors of the driving unit 6 to form a pattern which is nearly the same as the pattern displayed on the CRT 8 by operating the keyboard 7 on a fabric; a magnetic disk memory 20; and a printer 21.

Figure 4:
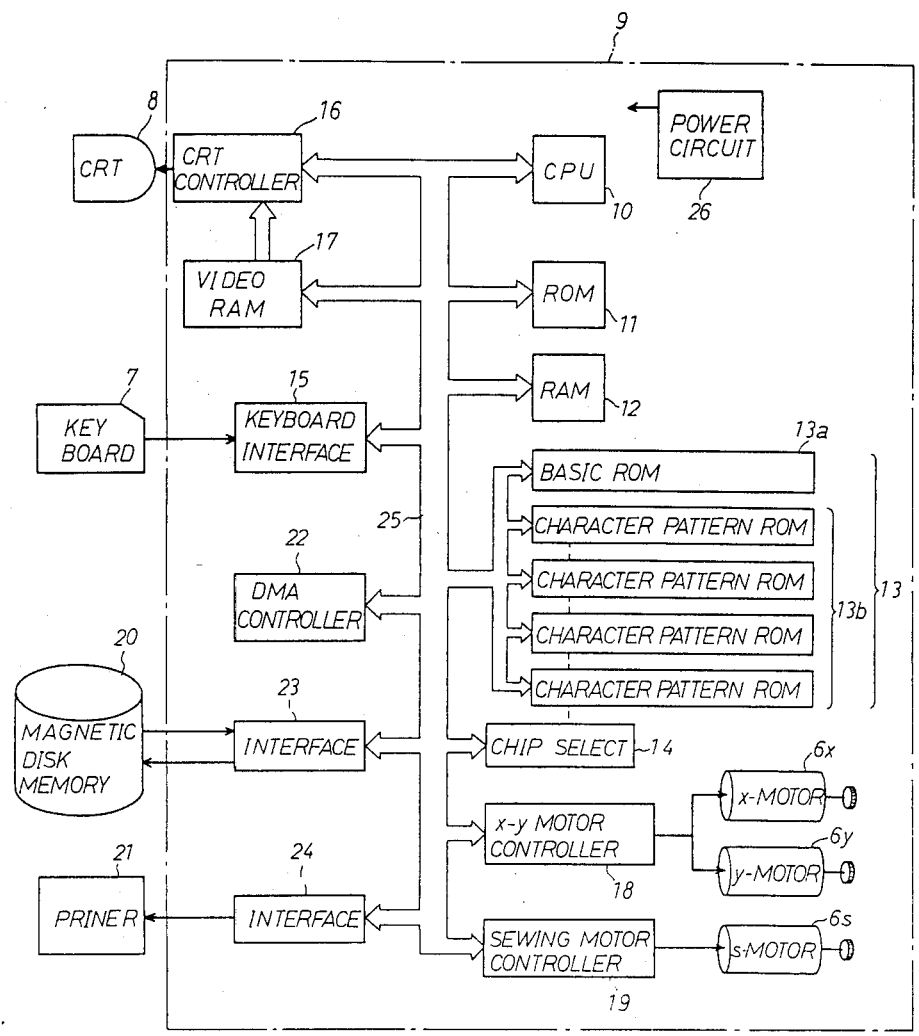
FIG. 4 is a block diagram of the embodiment of FIG. 3.

FIG. 4 is a block diagram showing the functional relation between the components of the embodiments shown in FIG. 3. In FIG. 4, there are shown the keyboard 7 functioning as an input unit and the CRT 8 functioning as a display unit. The driving unit 6 is provided, as explained with reference to FIG. 3, with three motors 6x, 6y and 6s. In FIG. 4, there are shown a central processing unit 10 (abbreviated to "CPU" hereinafter) for controlling the entire control system, a read-only memory 11 (abbreviated to "ROM" hereinafter) previously storing a series of control procedures to be executed by the CPU 10 and a random access memory (abbreviated to "RAM" hereinafter) 12 for temporarily storing the results of operations of the CPU 10. The CPU 10, the ROM 11 and the RAM 12 are the principal components of the microprocessor 9. A pattern ROM 13 stores previously a plurality of patterns which are to be selected by input signals given by means of the keyboard 7. In this embodiment, the pattern ROM 13 includes a basic ROM 13a which functions as a first memory unit and stores geometric pattern elements formed by straight lines and curves and character pattern ROMs 13b which function as a second memory unit and store alphabetical characters of block letter, Gothic letter and capital letter. A chip select 14 is provided to expand the memory area and the character pattern ROM has a plurality of ROM chips. A keyboard interface 15 is provided to enable the transmission of information between the CPU 10 and the keyboard 7. A CRT controller 16 controls the CRT 8 in accordance with the instruction given by the CPU 10 to make the CRT 8 display the contents written in a video RAM 17 in accordance with the instruction given by the CPU 10. An x-y motor controller 18 controls the x-motor 6x and the y-motor 6y for rotation in the normal direction or the reverse in accordance with an instruction given by the CPU 10 so that the fabric holding unit 2 is moved appropriately. A sewing motor controller 19 controls the sewing motor 6s likewise in accordance with an instruction given by the CPU 10 to drive the stitching needle 1' for vertical movement. A DMA controller 22 transfers the data stored in a magnetic disk memory 20 at a high speed to the RAM 12. In FIG. 4, also shown are an interface 23 interconnecting the magnetic disk memory 20 and the microprocessor 9, an interface 24 interconnecting the magnetic disk memory 20 and a printer 21, a bus 25 connecting the CPU 10, the ROM 14, the RAM 15 and other component devices, and a power circuit 26 for supplying power to the components.

The general constitution of the embodiment has been described with reference to the relation between the components thereof in connection with FIGS. 3 and 4. Each component will be described further in detail hereinafter.

Figure 5:
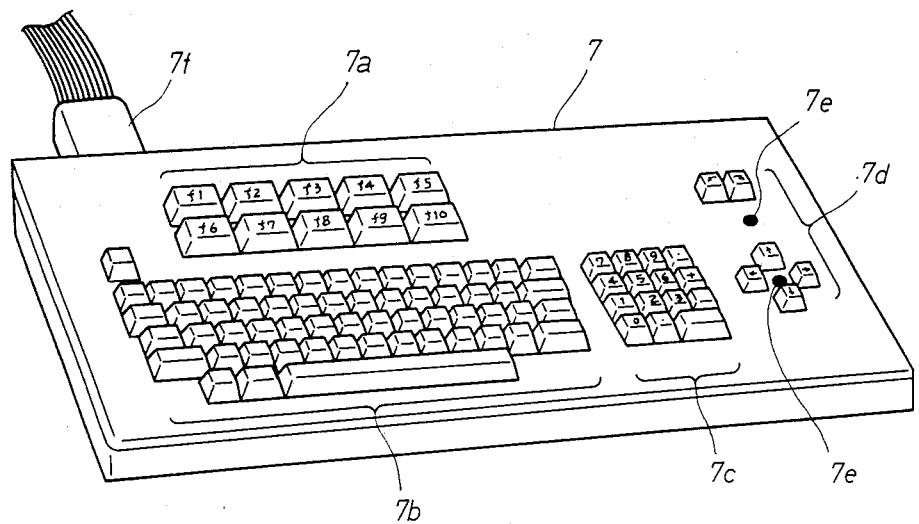
FIG. 5 is a perspective view of the input unit of FIG. 2.

FIG. 5 is a schematic perspective view of the keyboard 7 functioning as an input unit. In FIG. 5, there are shown function keys 7a for deciding the mode of keyboard input data, selection keys 7b such as well-known alphabetical character keys for various selection, ten keys 7c for facilitating the execution of numeral input operation, operation keys 7d marked with arrows symbolizing the operation of the system and provided from the view point of practical facility of the system, and light emission diodes 7e (abbreviated to "LED" hereinafter) for visually indicating input admittance for the operation keys 7d to improve the accessibility. These keys constitute a first input unit and a second input unit. Indicated at 7f is a connector to transmit information to the microprocessor.

Figure 6:
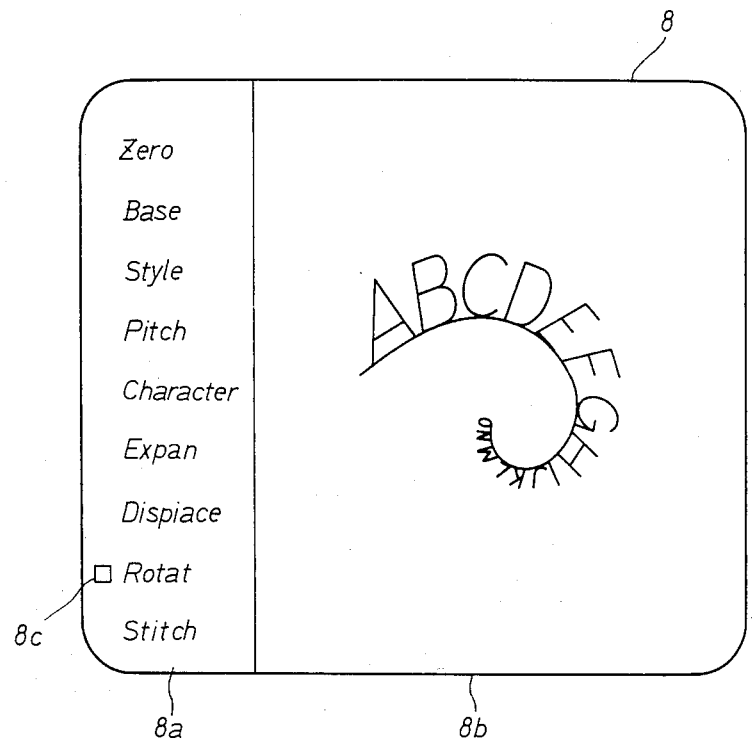
FIG. 6 is an illustration showing an example of display on the CRT of the display unit.

FIG. 6 shows an example of display on the CRT 8. As shown in FIG. 6, in this embodiment, the screen of the CRT 8 is divided into two areas, namely, into a function display area 8a in the left side of the screen for displaying the functions of system and pattern display area 8b in the right side of the screen for visually displaying created patterns. A cursor 8c is provided to improve the accessibility of the system by indicating a function indication corresponding to a function selected by means of the function keys 7a of the keyboard 7. The pattern display area 8a has a dot matrix of a predetermined dot density. A created pattern is displayed by the luminescence of the dots among the dot matrix calculated through a series of procedures for visual recognition of the created pattern.

Figure 7:
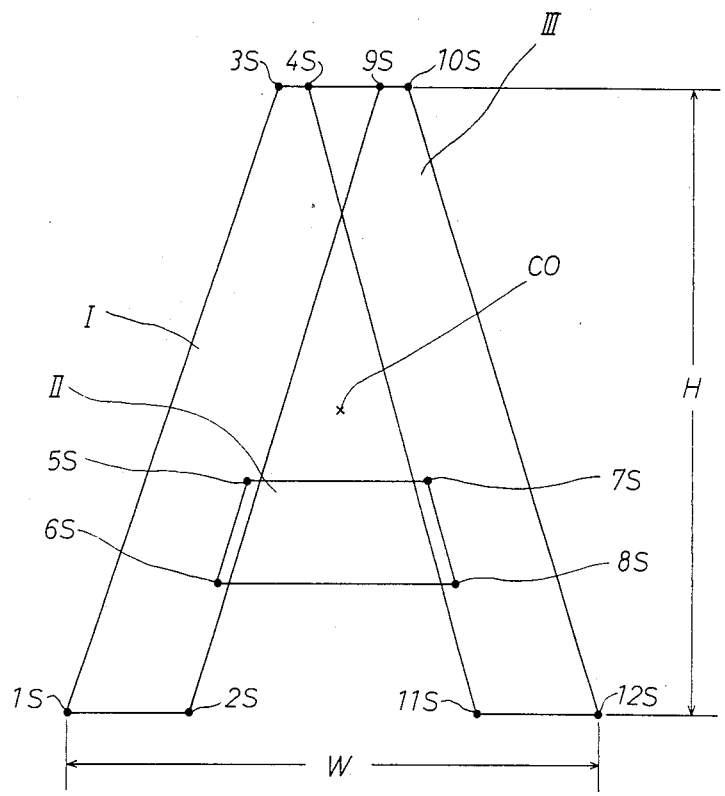
FIG. 7 is a diagram showing the storing process of the character pattern ROM of the embroidery machine of FIG. 2.

FIG. 7 shows the memory system of the character pattern ROM 13b storing pattern elements. In FIG. 7, the memory system for an alphabetic character "A" is shown by way of example. In this embodiment, each pattern element is stored in a set of a plurality of point with respect to a point CO corresponding to a first reference point defined for each pattern element. In the example of FIG. 7, the reference point CO is located at the middle of the height H and at the middle of the width W of the pattern element, namely, at the center of the pattern element. Stitching points 1S, 2S, 3S, ... and 12S are defined with respect to the reference point CO and a set of a plurality of columns (closed areas, I, II and III in FIG. 7) define a pattern element of a width.

Such a pattern element defined by a set of columns is stitched actually by controlling the operation of the sewing machine 1 and the driving unit 6 in the following procedure.

Figure 8:
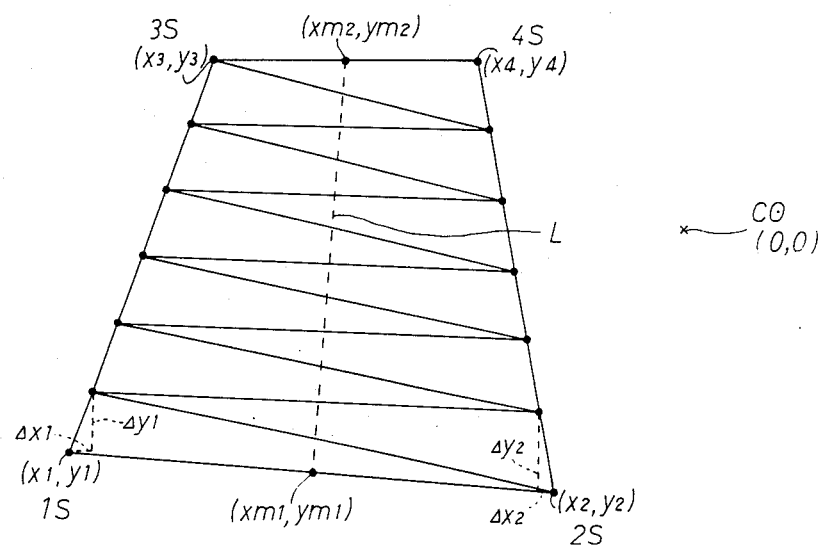
FIG. 8 is a diagram showing the procedure of processing one column of a pattern.
Figure 9:
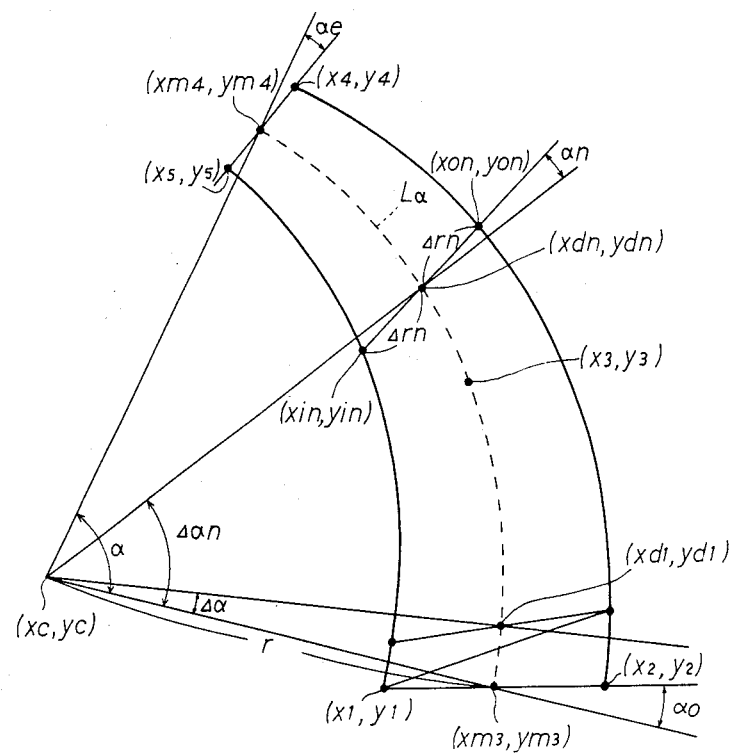
FIG. 9 is a diagram showing the procedure of processing another column of the pattern.

Firstly, columns are classified generally, from the nature of pattern elements, into two kinds of columns, namely, columns as shown in FIG. 8 formed by straight lines interconnecting stitching points and columns as shown in FIG. 9 formed by curves interconnecting stitching points. Accordingly, the present system is able to stitch pattern elements surely and correctly even is those two kinds of columns are moved in any manner.

Figure 10:
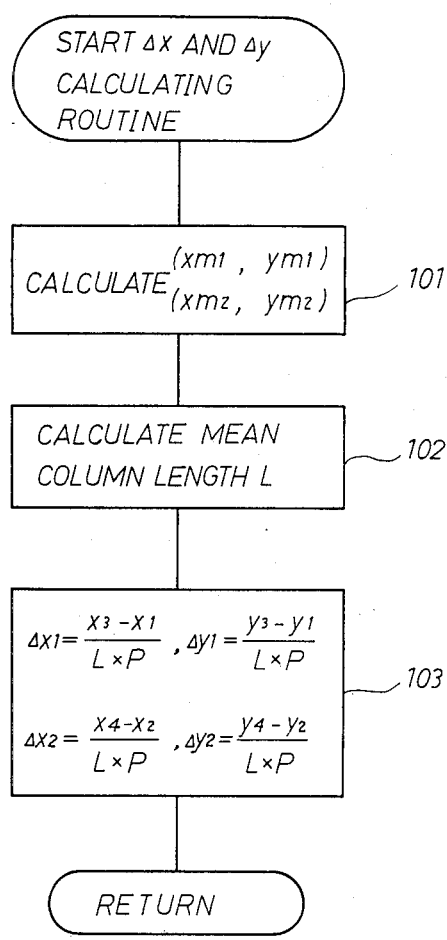
FIG. 10 is a flow chart of the column processing procedure of FIG. 8.

The column shown in FIG. 8 is defined by stitching points 1S, 2S, 3S and 4S represented by Cartesian coordinates $(X_1, y_1)$, $(x_2, y_2)$ $(x_3, y_3)$ and $(x_4, y_4)$ respectively with respect to the reference point CO as the origin. It is understood that this column can be stitched as shown in FIG. 8 by calculating stitching point shifting distances $x_1, y_1, x_2$ and $y_2$. FIG. 10 shows a flow chart of a procedure for calculating the stitching point shifting distances $\Delta x_1, \Delta y_1, \Delta x_2$ and $\Delta y_2$. This procedure is executed always be the CPU 10 for stitching a column of this kind. In the CPU 10, after it has been decided that the column is defined by four points $(x_1, y_1)$, $(x_2, y_2)$, $(x_3, y_3)$ and $(x_4, y_4)$, Step 101 is executed to obtain the respective middle points of sides between $(x_1, y_1)$ and $(x_2, y_2)$ and between $(x_3, y_3)$ and $(x_4, y_4)$ which are necessary for calculating the mean length L of the column.

Secondly at Step 102, the mean column length L is calculated by using the result $(xm_1, ym_1)$ and $(xm_2, ym_2)$ of Step 101. At the successive Step 103, the objective stitching point shifting distances $\Delta x_1, \Delta y_1, \Delta x_2$ and $\Delta y_2$ are calculated on the basis of a predetermined stitching pitch P (stitches/cm) and the mean column length L. Thus a uniform stitched pattern of a desired stitching pitch is obtained.

Figure 11:
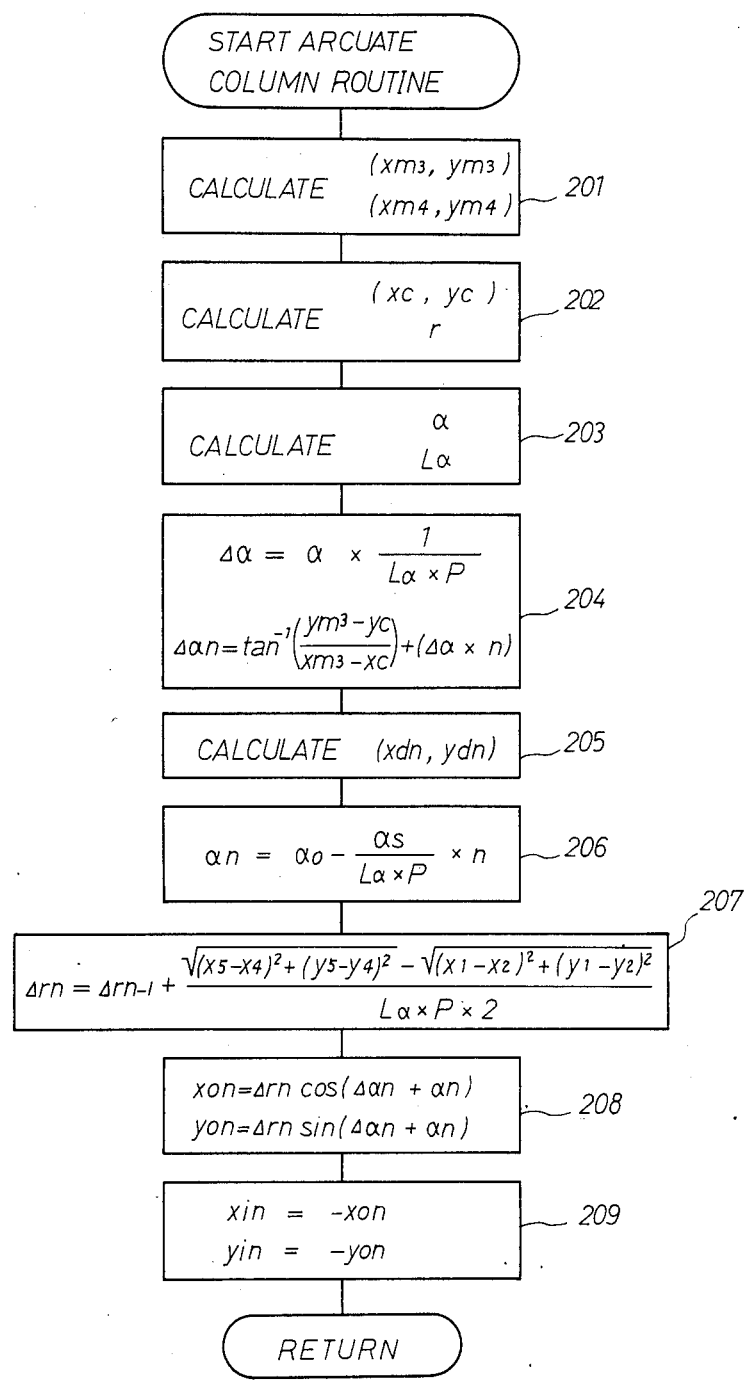
FIG. 11 is a flow chart of the column processing procedure of FIG. 9.

A control procedure for stitching the curved column shown in FIG. 9 will be described hereinafter in connection with the flow chart of FIG. 11. Differing from the rectangular column showing in FIG. 8, the column of this kind is defined as shown in FIG. 9 by five points: $(x_1, y_1)$, $(x_2, y_2)$, $(x_3, y_3)$, $(x_4, y_4)$ and $(x_2, y_5)$ When the column to be processed by the CPU 10 is identified to be a column defined by five points, Step 201 of the flow chart of FIG. 11 is executed.

As Step 201, the respective middle points $(xm_3, ym_3)$ and $(xm_4, ym_4)$ of lines extending between the points $(x_1, y_1)$ and $(x_2, y_2)$ and between the points $(x_3, y_3)$ and $(x_4, y_4)$. Then, at Step 202, the equation of a circle passing those two middle points and the stitching point $(x_3, y_3)$ is formed and the center $(xc, yc)$ and the radius r of the circle is calculated.

At the successive Step 203, the following two values are calculated on the basis of the circle with the center at $(xc, yc)$ and the radius r and the middle points $(xm_3, ym_3)$ and $(xm_4, ym_4)$. Firstly, an angle between a straight line segment extending between the points $(xc, yc)$ and $(xm_3, ym_3)$ and secondly a length L of an arc of the circle with the radius r on the angle are calculated.

Then, at the following Step 204, the angle $\Delta\alpha$ n for an arc formed on the circle with the center at $(xc, yc)$ and with a radius r by each stitch in stitching an arc of the length $L\alpha$ at a predetermined pitch is calculated by the use of the values of $\alpha$ and $L\alpha$ obtained at Step 203. At Step 205, imaginary stitching points $(xdn, ydn)$ $(n=1,2, ...)$ on an arc defined by the points $(xm_3, ym_3)$, $(x_3, y_3)$ and $(x_4, y_4)$ on the basis of the angle $\Delta\alpha n$ and the radius r.

At Step 206, the angles o and e of the column with respect of the radial direction of the circle with its center at $(xc, yc)$ is calculated to form stitches along the shape of the curved column defined by the points $(x_1, y_1)$, $(x_2, y_2)$, $(x_3, y_3)$, $(x_4, y_4)$ and $(x_5, y_5)$ on the basis of the imaginary stitching points obtained at Step 205, and then $\alpha n$ $(n=1,2,3, ...)$ is calculated as shown in FIG. 9 on the basis of an angular difference $\alpha s = \alpha o - \alpha e$ and $(xdn, ydn)$. At the next Step 207, the differences $\Delta rn$ between the actual stitching points $(xon, yon)$, $(xin, yin)$ and the imaginary stitching points $(xon, yon)$, $(xin, yin)$ and the imaginary stitching points $(xdn, ydn)$ are calculated.

At the following Step 208, $(xon, yon)$ is calculated with respect to the known origin $(xdn, ydn)$ on the basis of $\Delta rn$, $\Delta\alpha n$ and $\alpha n$.

At Step 209, $(xin, yin)$ is calculated likewise on the basis of $(xon, yon)$ to obtain the objective points $(xin, yin)$ and $(xon, yon)$ $(n=1,2,3, ...)$ on the basis of $(xon, yon)$.

The pattern element storing system of the character patter ROM 13b, i.e., the second memory means of this system, and the process for calculating the stitching points at which the stitching needle 1' forms stitches on a fabric on the basis of stored information have been described in detail. The pattern element is displayed visually on the CRT 8 through the same procedures. At mentioned earlier, a dot matrix formed of a set of a plurality of regularly arranged dots is provided previously in the pattern display unit of the CRT 8 and the dots corresponding to the stitching points shown in FIGS. 8 to 11 are caused to emit light for the visual display of the pattern elements so that a pattern which is practically the same as a pattern to be formed on a fabric under the control of the microcomputer 9 is displayed tow-dimensionally on the CRT 8. This embodiment is constituted so that a pattern which is practically the same as a pattern to be actually stitched by the stitching needle 1' is displayed through the calculation of straight lines passing the stitching points determined in accordance with the above-mentioned procedure.

[Operation]

The relative actions between the components of the embodiment of the present invention described hereinbefore will be described.

Figure 12:
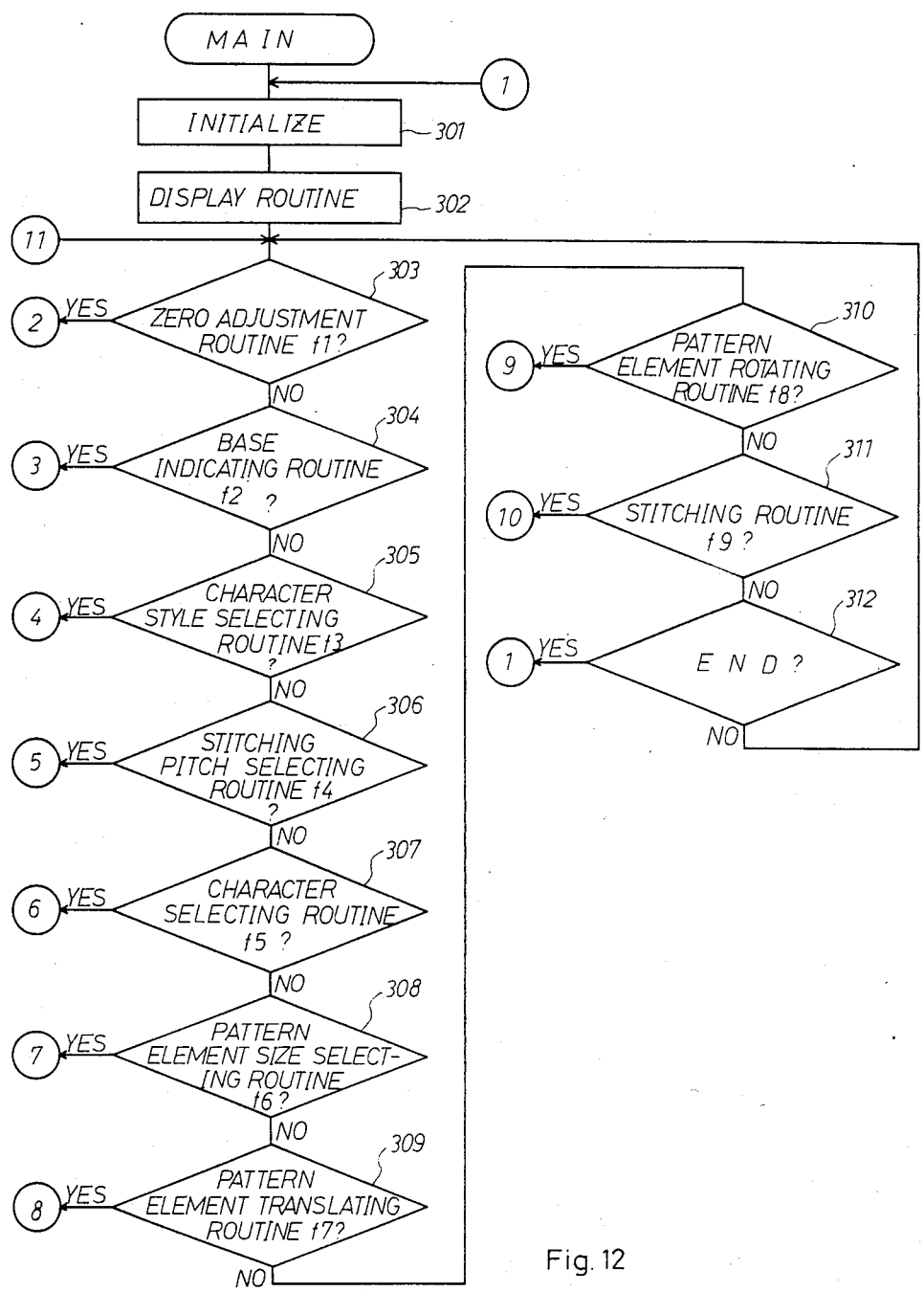
FIG. 12 is a flow chart of the main outline of an embodiment of the present inention.

FIG. 12 is a flow chart of the main control routine of the control system according to the present invention. In FIG. 12, Step 301 is an initialization routine for clearing and initializing the controllers of the system, namely, the RAM 12, the video RAM 17, the CRT controller 16, the x-y motor controller 18 and the sewing motor controller 19, which are used for necessary control operations. Step 302 is a display routine in which the main processing procedure is started and the ready state of control operations for the following operations is displayed on the CRT 8. The contents of the display on the CRT 8 are those as shown in the function display area 8a in FIG. 6.

At Steps 303 through 312, various function routines are selected upon the input of instructions. That is, when the function keys f1 to f9 are not operated, Steps 301 through 312 are carried out sequentially and the process is returned again to Step 303 to repeat the closed loop. If either of the function keys f1 to f9 is operated, a routine among routines ②to ⑩ corresponding to the step corresponding to the operated function key is performed, and then the process is returned to a routine ⑪ to perform the process of the closed loop of Steps through 312.

The selection of a routine among the selectable routines ② to ⑩ is indicated as mentioned earlier on the function display area 8a by indicating a letter representation corresponding to the function by operating the function keys 7a of the keyboard 7 with the cursor 8c as shown in FIG. 6 so that the operating status of the system can always be recognized.

The function routines which are selected at the steps of the control procedure will be described in the following.

Figure 13:
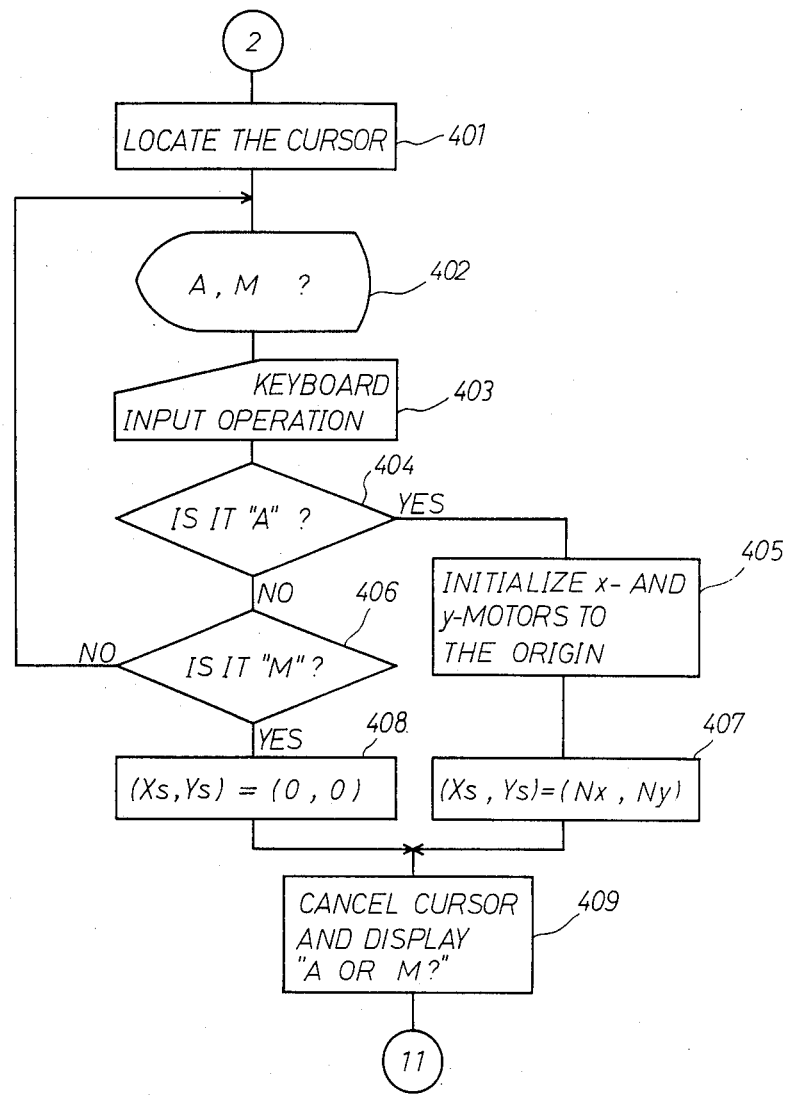
FIG. 13 is a flow chart of a zero adjustment routine.

FIG. 13 is a flow chart of a zero adjust routine selected at Step 303 of FIG. 12. The zero adjust routine defines the relative position between a pattern formed on the CRT 8 and the stitching needle 1'. When the function key f1 of the keyboard 7 is operated, Step 303 of FIG. 12 is performed, then the control process is branched from the selection routines (Steps 303 to 312) to Step 401. At Step 401, the cursor is moved to the head of representation "Zero" on the CRT 8 to indicate that the process of the system has moved to this routine. At the following Step 402, the decision of either automatic or manual operation for "Zero adjustment" is asked by displaying "A or M?" on the CRT 8 to demand for the input of "A" (Automatic) or "M" (Manual). At the successive Step 403 the procedure waits for keyboard input and when any key is operated, the procedure advances to Step 404.

At Step 404, decision is made whether or not the input character at Step 403 is "A". If "A", the procedure goes to Step 405 and if not "A" the procedure goes to Step 406. At Step 406, decision is made if the input character at the preceeding Step 403 is "M" or not. If not "M" the procedure returns to Step 402 to demand for the input either of "A" or of "M".

The routine of Step 405 is implemented when the input is "A" to command the x-motor and the y-motor of the driving unit 6 to move the embroidery hoops 2' unconditionally to the predetermined corner of the sewing table 5, which facilitates mounting a fabric on the embroidery hoops 2'. At the successive Step 407, data Nx and Ny are stored as variables Xx and Yx which are necessary to move the embroidery hoops 2' which have previously been moved to the predetermined corner of the sewing table 5 to a position exactly below the stitching needle 1' of the sewing machine 1 when the function "Stitch" is implemented.

The routine of Step 408 is executed when the input at Step 403 is "M". Since the variables (Xs, YS) need not be set, (Xs, Ys)=(0, 0) and the procedure goes to Step 409.

The routine of Step 409 is implemented when (Xs, Ys) are set at Step 407 or 408. The indication by the cursor and the representation "A" or "M?" provided at Steps 401 and 402 are cancelled to indicate the completion of the routine of Step 409. The procedure returns to the main routine 11 of FIG. 12 as shown in FIG. 13.

Figure 14:
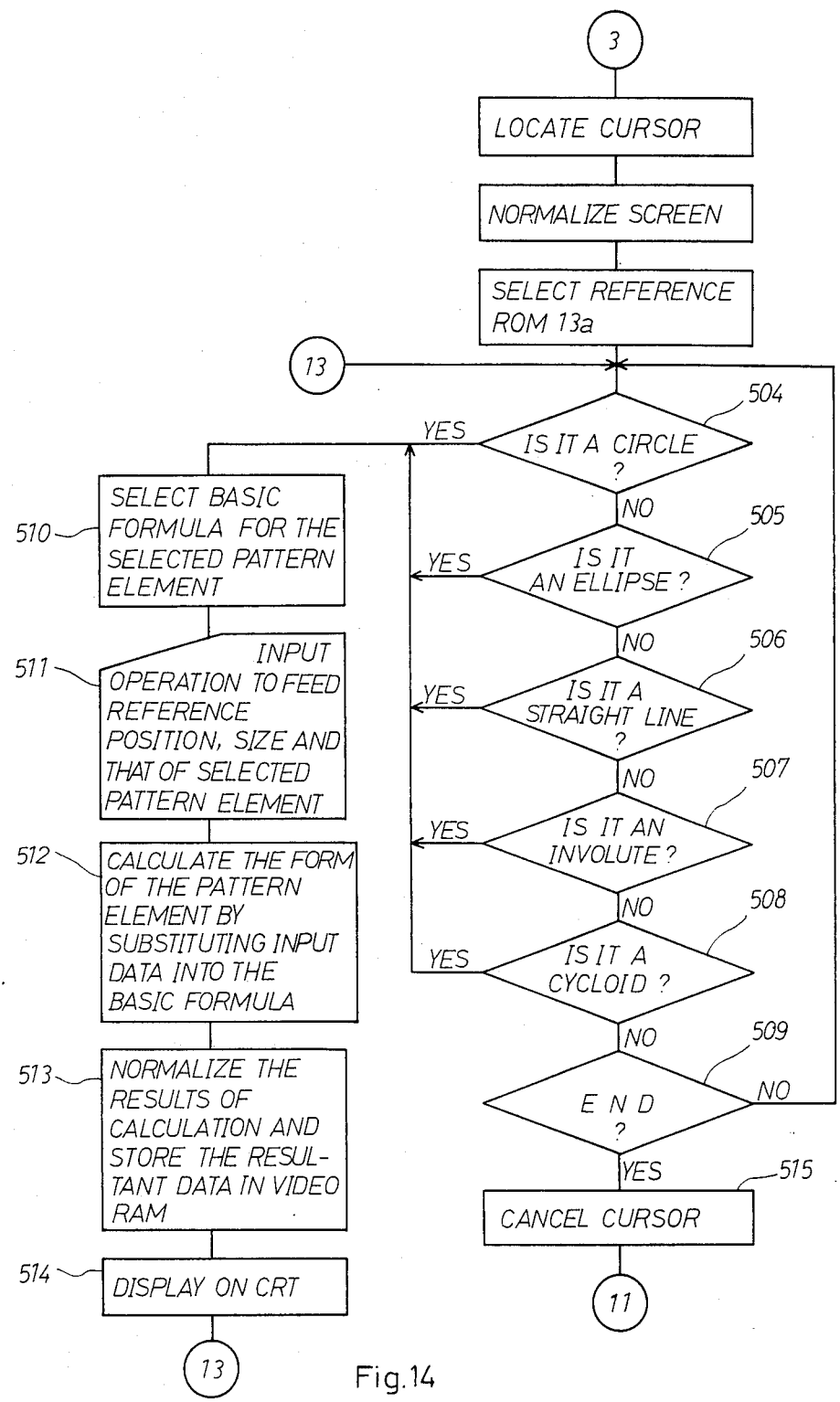
FIG. 14 is a flow chart of a reference display routine.

FIG. 14 is a flow chart of a "Base display" routine selected at Step 304 of FIG. 12. This routine is represented by a display "Base" displayed on the CRT 8. This "Base display" routine displays basic geometric patterns in the pattern display area 8a to facilitate the creation of a pattern consisting of a set of pattern elements. At Step 501, the cursor is located at the head of the representation "Base" on the CRT 8 to indicate that the "Base display" routine has been selected by operating the function key f2.

Figure 15:
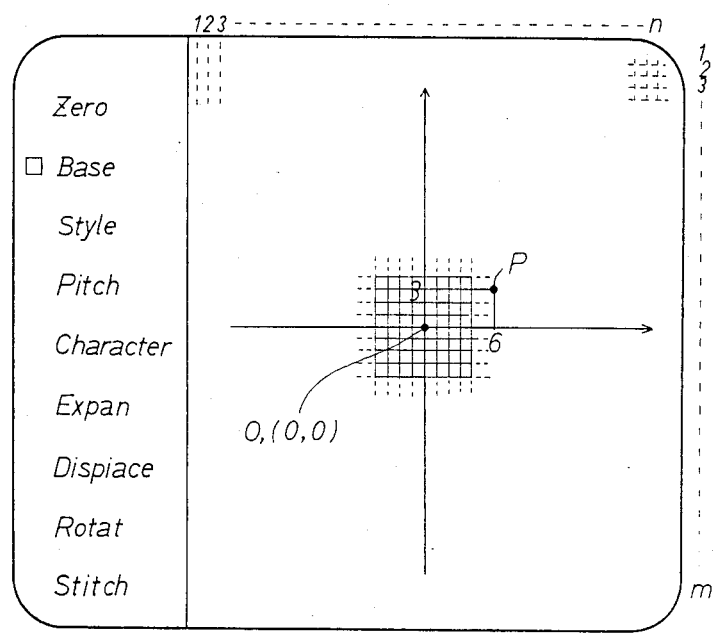
FIG. 15 is a diagram showing an imaginary Cartesian coordinates on the CRT 8.

Step 502 is a normalization step to set the control system for the processing of numeric inputs on a Cartesian coordinate system with its origin at the center of the pattern display area 8b of the CRT 8. As shown in FIG. 15, the pattern display area 8b of the CRT 8 is provided with a matrix of m lines and n rows which displays a pattern by dots of light emitted by the elements of the matrix. Since assigning the elements of the matrix is a troublesome work, the Cartesian coordinate system with its origin at the center of the pattern display area 8b, i.e., point 0 shown in FIG. 15, is employed for the successive operations. Accordingly, when an element of the matrix at the point 0 is represented by (no, mo) (=(x,y)(=(0,0)) and coordinates (x, y)=(6, 3) of a point P is given as an input, the control system normalized at the normalization step causes an element of the matrix represented by a point (no+6, mo−3) on the matrix to emit light.

At Step 503, the basic ROM 13a storing formulas of basic patterns for forming various geometric patterns is selected by using the chip select 14 and connected to the system including the CPU 10 to enable the implementation of the successive routines on the basis of the data stored in the basic ROM 13a.

The closed loop of Steps 504 through 509 includes processes for the selection of the formulas of the basic patterns stored in the basic ROM 13a. In this embodiment, five kinds of formulas, namely, formulas for circle, ellipse, straight line, involute and cycloid, are stored in the basic ROM 13a. When either of those steps is selected, the corresponding program stored in the basic ROM 13a is executed. If, for example, "Circle" is selected, the basic formula $(x-A)^2+(y-B)^2=R^2$ is selected at Step 510 and at the next Step 511 the necessary data for this basic formula such as the size of the pattern (radius R) and the location of the pattern (center of the circle (A, B)) is requested.

At Step 512, the pattern specified by the operator is calculated on the basis of the basic formula and the necessary data which have been obtained at steps by Step 511 and the calculated result is normalized at Step 513. The normalized result is stored in the video RAM 17 as information representing the elements of the matrix. At Step 514, the CRT controller 16 makes, on the basis of the data stored in the video RAM 17, the corresponding elements of the matrix formed in the CRT 8 emit light. Thus a series of actions are completed at the procedure returns to the routine 13 of FIG. 14 to wait for the next selection of a basic pattern through the Steps 504 through 509 of the closed loop.

The procedure for selecting and displaying a basic pattern has been described with reference to the selection and display of a circle. Other basic patterns are capable of being displayed likewise on the CRT 8. Displaying patterns other than those basic patterns likewise are achievable through the employment of the well-known computer graphic art and the detailed description thereof is omitted.

Figure 16:
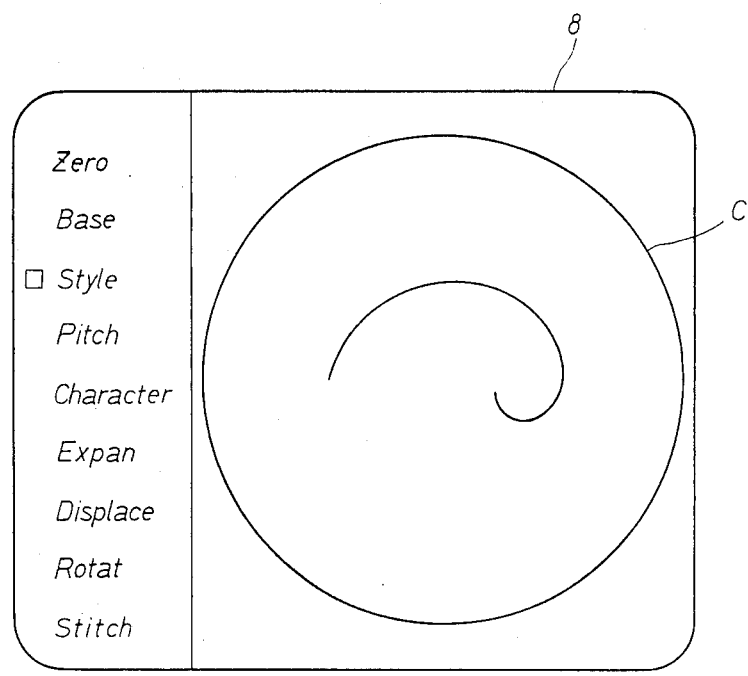
FIG. 16 is an illustration showing an example of display on the CRT 8.

Since the pattern selecting and displaying routine is recurrently executable, two or more pattern elements can be displayed on the CRT 8 as shown in FIG. 16. In FIG. 16, the size of the embroidery hoops 2 is shown typically by a circle C, and then an involute is displayed inside the circle C, which enables the creation of a pattern within the range defined by the embroidery hoops 2'.

After a desired geometric pattern has thus been displayed on the CRT 8, an "END" key is depressed to execute Step 509. Then, the procedure leaves the selection Steps 504 through 509 and goes to the successive Step 515. At Step 515, the cursor displayed at Step 501 is cancelled and the procedure returns to the main routine 11 of FIG. 12.

Figure 17:
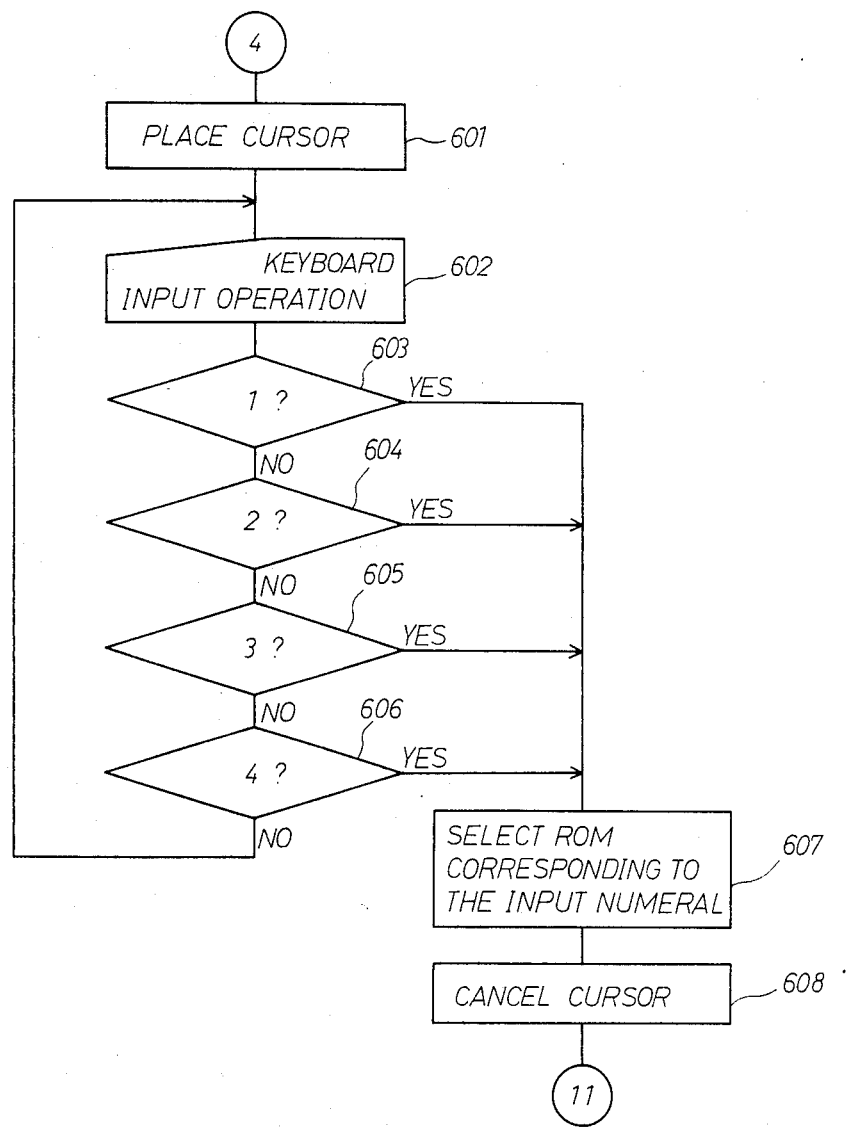
FIG. 17 is a flow chart of a style selecting routine.

FIG. 17 is a flow chart of a "Style selection" routine which is executed when selected at Step 305 of FIG. 12.

At Step 601, a selected routine is indicated by the cursor on the CRT 8. In this case, the cursor is displayed at the head of "Style".

At Step 602, the provision of an input signal by means of the keyboard 7 is waited for. When any input signal is given, the procedure goes to selection Steps 603 to 606.

At these steps, decision is made whether or not the input information given by operating the keyboard 7 at Step 602 is either one of numerals 1, 2, 3 and 4 and when the input information is other than those numerals, Step 602 is repeated and the same procedure is repeated. When it is decided selectively at Steps 603 to 606 that either one of numeral 1, 2, 3 and 4 has been given as input informations, Step 607 is executed. At Step 607, the character pattern ROM 13b consisting of a plurality of ROMs is selected and one of the ROMs is connected electrically to the control system including the CPU 10 to execute control operation by using the data stored in the selected ROM. This embodiment employs a chip select 14 for selecting a ROM 13 among a plurality of the ROMs 13, however, the selection may be made likewise through the application of a software. As shown in FIGS. 4 and 17, the character pattern ROM 13b employed in this embodiment consists of four ROMs to improve the flexibility of the system by constructing part of the character pattern ROM 13b in the cartridge system so that a set of character styles can be stored in a single cartridge.

At Step 608, the cursor displayed at Step 601 is cancelled to indicate the completion of this routine. Then, the procedure returns to the main routine 11 of FIG. 12.

Figure 18:
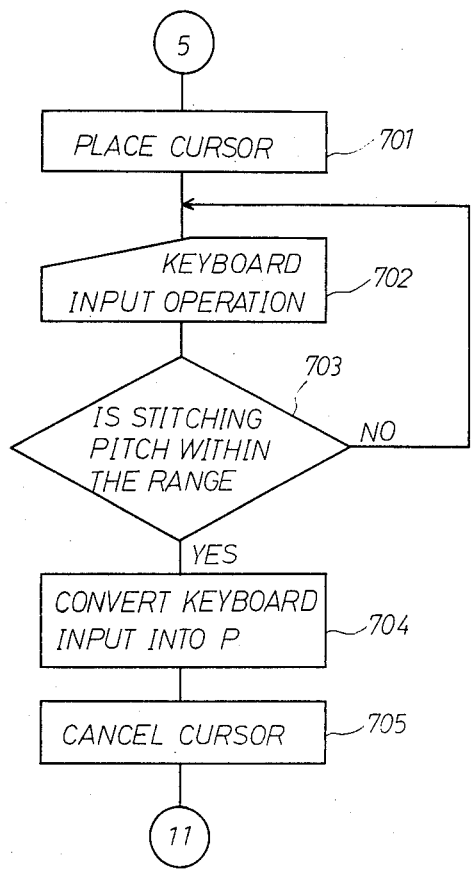
FIG. 18 is a flow chart of a pitch setting routine.

FIG. 18 is a flow chart of a "Pitch setting" routine. This routine is selected at Step 306 of FIG. 12 and is executed by operating the function key f4 of the keyboard 7.

At Step 701, the same actions performed in the above-mentioned routines are performed. The description of those actions are omitted. At Step 702, keyboard input operation is waited for. When any input operation is performed, the procedure goes to Step 703.

At Step 703, it is decided whether or not the input given at Step 702 is an numeric input within a predetermined range of pitch (stitches/cm). If the input is a numeral within the predetermined range, Step 704 is executed and if not, it is decided that a wrong operation has been made and the procedure is returned to Step 702 to wait for a new input.

At Step 704, an input numeric data given at Step 702 is set for the variable P when decision is made that the input numeric data is normal.

The process after Step 705 is identical with that of Step 608, hence the explanation thereof will be omitted.

Figure 19:
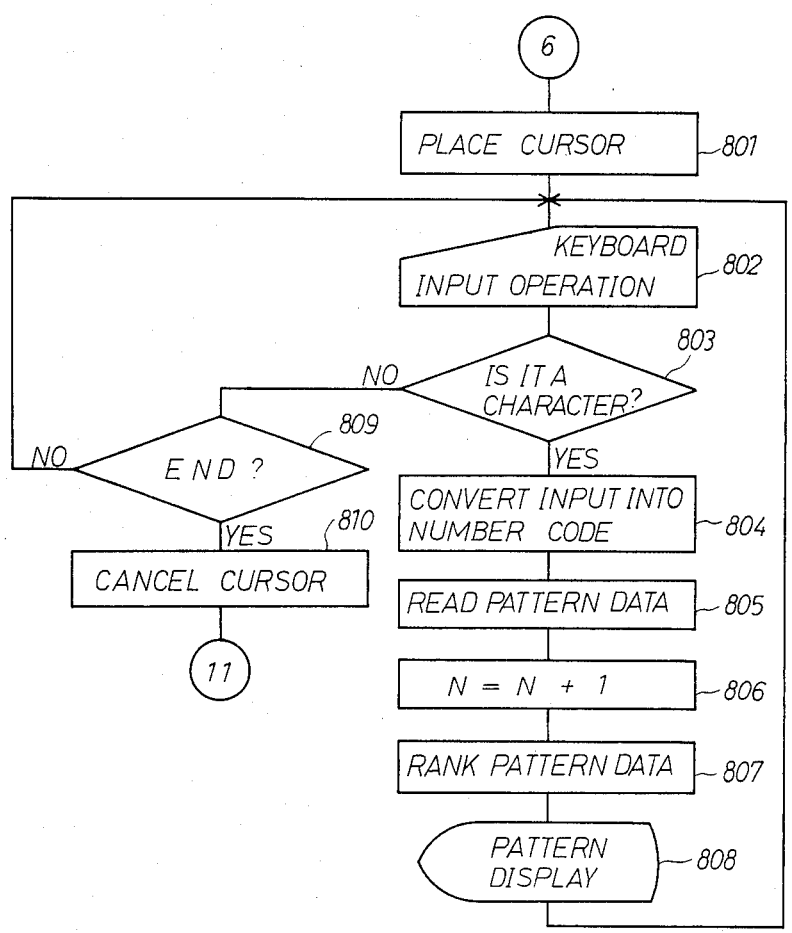
FIG. 19 is a flow chart of a character selecting routine.

FIG. 19 is the same as the above-mentioned Steps 401, 501, 601 and 701, hence the explanation thereof will be omitted. At Step 802, keyboard input operation is waited for an the execution of the routine is suspended until some input is given.

Step 803 is an input information discriminating step, in which decision is made if the input is one given by means of the selection keys 7b or not. If the input is an input given by means of the selection key 7b, the routine goes to Step 804.

At Step 804, the input given by means of the selection keys 7b is converted into an "Address code" in accordance with a predetermined conversion code system. Address codes represent storage locations corresponding to a single character (FIG. 7) stored in each character pattern ROM 13b. The character pattern ROM 13b is one ROM selected through the execution of the style selection routine of FIG. 17. A desired pattern element is selected through the execution of Step 804.

At Step 805, the CPU 10 reads the data representing one selected pattern element, namely, the desired data among those stored in the character pattern ROM 13b and stores the same data in a predetermined storage area in the ROM 12.

At Step 806, the variable N is subjected to an incremental operation. The variable N is initialized to "0" in the initializing routine of the main routine of FIG. 12.

At Step 807, the pattern data stored in the predetermined storage area at Step 805 is subjected to ranking using the variable N to enable the designation of the selected pattern data for the control system in the following processes only by designating the rank.

Figure 20:
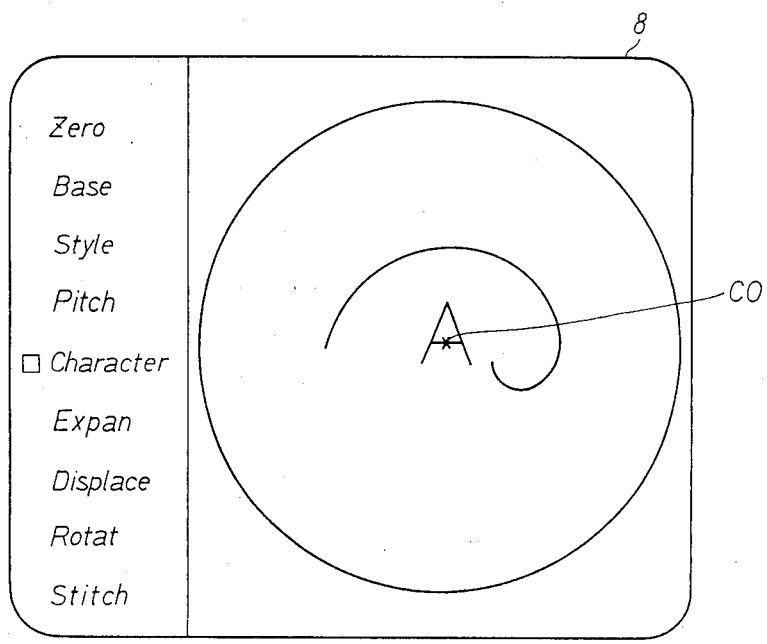
FIG. 20 is an illustration showing an example of display on the CRT 8.

At Step 808, the selected pattern element is displayed on the CRT 8. As described in detail hereinbefore, in this displaying process, the pattern data stored in the RAM 12 at Step 805 is calculated to determined the stitching points of the pattern element according to the procedure explained in connection with FIGS. 8-11, and then the data of the determined stitching points is normalized with respect to the center of the pattern display area 8b as the origin of the x-axis and the y-axis of a Cartesian coordinate system and the normalized data is given to the video RAM 17. For example, if a character "A" is selected when the screen of the CRT 8 is in the state as shown in FIG. 16, the character "A" is displayed on the screen as shown in FIG. 20. As apparent from FIG. 20, the center of each pattern element is stored as the center CO of the corresponding pattern data and the pattern data is normalized with the center of the pattern display area 8b of the CRT 8 as the origin of the Cartesian coordinate system at Step 808 of this routine, therefore, the pattern element is displayed in the central position on the screen of the CRT 8 as shown in FIG. 20.

After the operation at Step 808 has been completed, the procedure returns to Step 802. If it is desired to selected a plurality of characters, selection of characters by means of the selection keys 7b of and the successive execution of the above-mentioned routine including Steps 802 through 808 is repeated.

If a key other than the selection keys 7b is operated, Step 809 is executed through Step 803.

Step 809 decides if the key "End" was operated at Step 802. If so, the procedure goes to Step 810 and if not, it is decided that an errouneous operation was made and the procedure is returned again to Step 802.

Upon the operation of the key "End", the indication of the execution of this routine by the cursor provided at Step 801 is cancelled. After Step 810 has been executed, the procedure is returned to the main routine 11.

Figure 21:
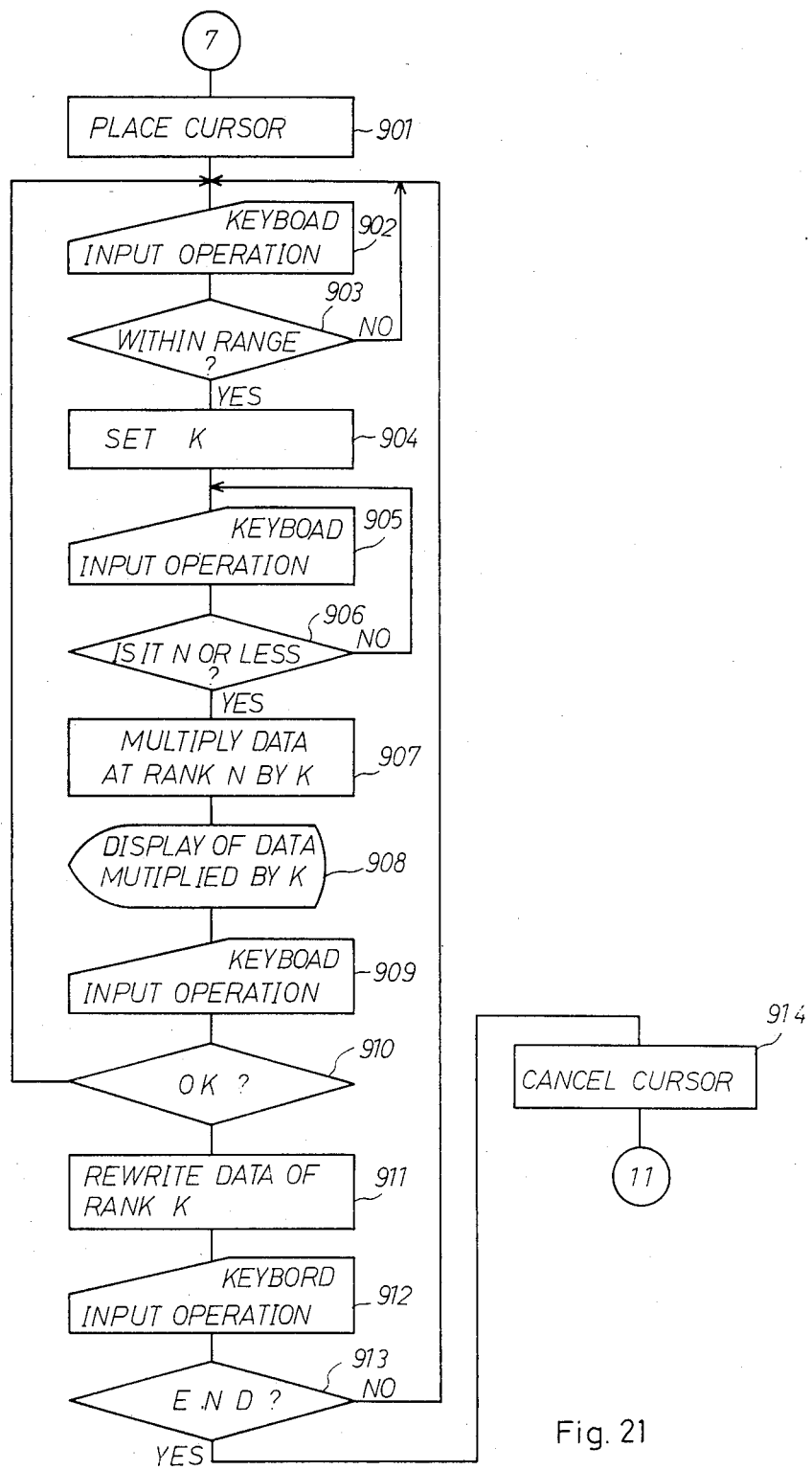
FIG. 21 is a flow chart of a character size routine.

FIG. 21 is a flow chart of the "Character size" routine to be selected at Step 308 shown in FIG. 12.

At Step 901, the selecting of this routine is indicated, similarly to the indication at Steps 401, 501, . . . and 801, by the cursor placed at the head of the representation "Expan" on the CRT 8.

Step 902 waits for the operation of the keyboard for designating the size of the pattern element. In this embodiment, the procedure goes to Step 903 when a value corresponding to a desired expansion or reduction within a predetermined range of a pattern element (FIG. 7) is provided by means of the ten keys 7c of the keyboard 7.

At Step 903, the numeric data given at Step 902 is examined to decide if the numeric data is within the predetermined range. If not, the procedure is returned to Step 901 to require the reexecution of the numeric data input operation. If the input numeric data is within the predetermined range, the procedure goes to Step 804.

At Step 904, the input numeric data is stored in the form of a variable K. After a pattern element magnifying factor has been decided by executing Steps 901 through 904, a pattern element to be magnified or reduced by the magnifying factor "K" is given by operating the keyboard 7 at Step 905. Pattern elements capable of being designated at Step 905 are limited to those which have been read from the character pattern ROM 13b and stored in the RAM 12 previously through the routine "Caracter selection" shown in FIG. 19 and the process of designation is carried out in accordance to the rank "N" specified for every pattern element. Accordingly, with reference to the example shown earlier in FIG. 20, the process of designation is carried out upon the input of the rank N=1 attached to the character "A".

At Step 906, decision that the input numeric data is equal to or less than the variable N is made. If the input numeric data is greater than the variable N, the procedure is returned to Step 905 to require the reexecution of the input operation. If the numeric data is equal to or below the variable N, the procedure goes to Step 907.

At Step 907, data representing the coordinates of a stitching point stored in the pattern storage area with the rank N in the RAM 12 is read, the x-distance and y-distance of the coordinates are multiplied by value K of the variable K and there resultant values are stored temporarily in another area in the RAM 12. Thus the pattern data of rank N stored in the RAM 12 is expanded or reduced with the reference point CO of pattern data by the magnifying factor K.

Figure 22:
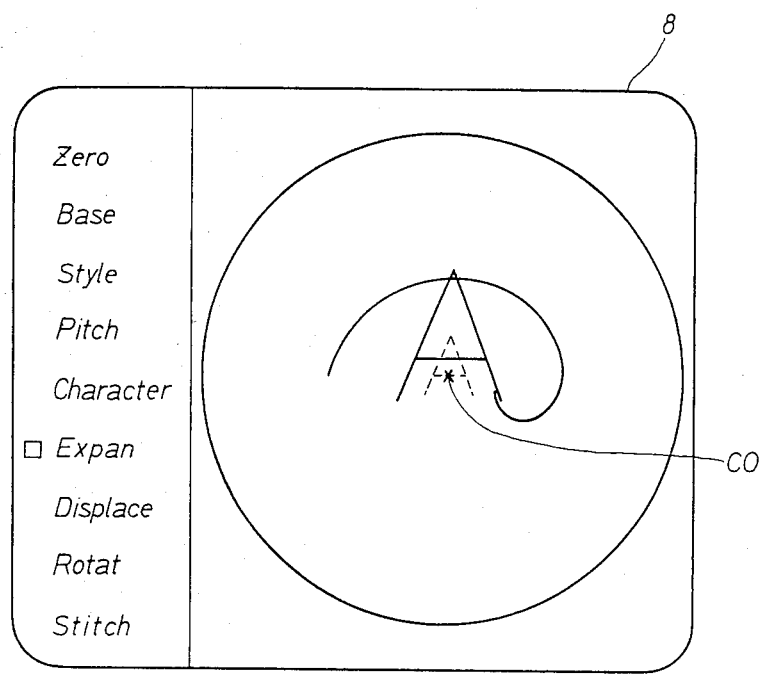
FIG. 22 is an illustration showing an example of display on the CRT 8.
Figure 23:
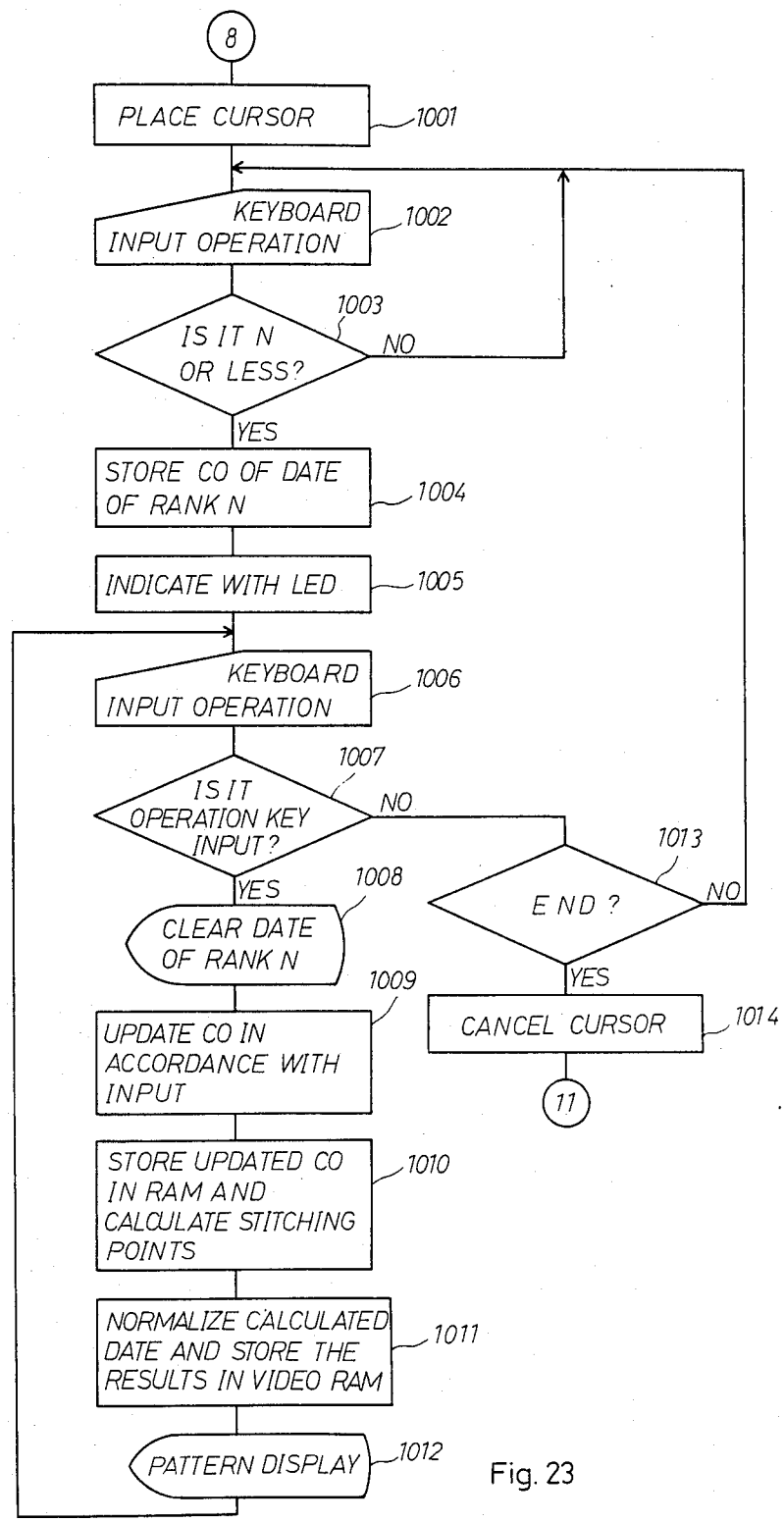
FIG. 23 is a flow chart of character shifting routine.

At Step 908, the pattern data of rank N expanded or reduced by the magnifying factor K is displayed on the CRT 8. Since this routine only magnifies the data of the stitching point by the magnifying factor K, the pattern data is displayed on the CRT 8 with the first reference point CO of the pattern data of rank N as the center. Accordingly, the character A is displayed as shown in FIG. 20 ad when the character A is doubled in size, the character A is expanded around the reference point CO as shown in FIG. 22.

At Step 909, the expanded pattern element displayed on the CRT 8 is examined visually to decide if the expanded pattern element is approvable and an input representing the decision is given.

At Step 910, the input representing the decision is examined. If the input indicates that the expanded pattern element is not approvable, the procedure is returned to Step 902 and the above-mentioned procedure is repeated until a desired pattern is obtained. If the input indicated that the expanded pattern element is approvable, the procedure goes to Step 911.

At Step 911, the data is rewritten. The data multiplied by the magnifying factor K and stored at Step 907 is stored again at the data address of each stitching point stored in the pattern storage area of the rank N in the RAM 12. The data multiplied by the magnifying factor K and stored temporarily is erased, since the data is necessary no longer, for the effective utilization of the storage capacity of the RAM 12.

At Step 912, an input representing the necessity of the expansion or reduction of a further pattern element through this routine or the end of this routine is given. The input given at Step 912 is examined at Step 913 to decide if a further pattern element needs to be processed through this routine. If any pattern element needs to be processed through this routine, the procedure goes to Step 902 so that the preceeding steps are repeated. If not, Step 914 is executed to cancel the indication by the cursor established at Step 901 to inform the operator of the end of this routine and the procedure is returned to the main routine 11.

FIG. 13 shows a flow chart of "Character displacement" routine, which is selected by step 309 of the main routine. this routine carries out the translation of pattern elements as designated by "Displace" on the CRT 8.

At Step 1001, the cursor is placed at the head of the indication "Displace" on the CRT 8 to indicate that the control system is prepared for the execution of this routine.

At Step 1002, the rank N attached to a pattern element desired to be moved through the execution of this routine is given. At Step 1003, decision if the input given at Step 1002 is correct. When a number greater than the rank N presently set in the control system is given or no numeric input is given, the procedure is returned to Step 1002 to require correct input operation. When a correct input is given, the procedure goes to Step 1004.

At Step 1004, among the pattern data of the rank N stored in the RAM 12, the data of the reference point CO of the stitching points of the pattern element is loaded. The data of the point CO of each pattern element is the coordinates (xco, yco) on the imaginary Cartesian coordinate system on the CRT 8. Accordingly, the data of the point CO which has just been displayed on the CRT 8 through the execution of the character selection routine shown in FIG. 18 is (0, 0), hence the pattern element is displayed with its center at the zero point of the pattern display area 8b as shown in FIG. 20 or 22.

At Step 1005, the LED 7e is turned on to indicate readiness for the input operation of the operation keys 7d of the keyboard 7. This routine is capable only of the translation of pattern elements, the LED provided at the center of the arrangement of arrows indicating upward, downward, rightward and leftward directions respectively and the operation of the keys provided with those arrows indicating those four directions respectively is effective thereafter.

At Step 1006, input operation is waited for and when any input operation is performed, the next Step 1007 is executed.

At Step 1007, the input given at Step 1006 is examined to decide if the input is one that was given by operating either one of those four operation keys, i.e., the keys with arrows. When the input is given by operating the key with arrow, the procedure goes to Step 1008. Otherwise, the procedure goes to Step 1013.

At Step 1013, the key input is examined to decide if it is an input given by means of the END key. If the key input is an input other than the input by means of the END key, the key input is identified as a false input and the procedure goes to Step 1002. When an input by means of the END key, the procedure goes to Step 1014.

At Step 1014, the cursor displayed at Step 1001 is canceled and the LED turned on at Step 1005 is turned off to indicate the completion of the execution of this routine and the procedure is returned to the main routine ⑪.

As mentioned above, the Step 1008 is executed when an input is given by means of the key with arrow to clear the contents of the video RAM 17 corresponding to the rank N of the pattern element provided at Step 1003. That is, since the CRT controller 16 controls the CRT 8 on the basis of the contents of the video RAM 17 to display a picture on the CRT 8, the pattern of the pattern rank N is erased from the CRT 8.

Then, Step 1009 is executed to update the value of the reference point CO of the pattern element in accordance with the input of the key with arrow through a simple add-subtract operation, namely, when the input is given by the key with the arrow "→" for the translation of the reference point CO in the negative direction of the x-axis of the coordinate system shown in FIG. 15 the value of CO is updated to (xco-Ex, yco); when by the key with the arrow "→", to (xco+Ex, yco); when by the key with the arrow "→", to (xco, y=Ey); and when by the key with the arrow "→", to (xco, y+Ey) (Ex and Ey are arbitrary constants goes to the next Step 1010.

At Step 1010, two operations are performed. First, the new coordinates of the point CO is stored in the RAM 12. Secondly, all the stitching points are calculated in accordance with the computing procedure described with reference to FIGS. 8 to 11.

At the successive Step 1011, the computed data is normalized appropriately for display on the CRT 8 and the normalized data is stored in the video RAM 17.

At Step 1012, the CRT controller 16 is controlled on the basis of the normalized data stored in the video RAM 17 to display the pattern element on the CRT 8 at a location translated by Ex or Ey from the original location, and then the procedure is returned to Step 1006.

Thus the Steps 1006 through 1012 are executed repeatedly and the pattern element can be translated by the constant Ex or Ey every time the Steps 1006 through 1012 are executed as long as the keys with arrow are operated.

In this embodiment, a pattern element is translated stepwise for a fixed distance at a time, however, the final coordinates (xco, yco) of the pattern element may be designated directly, in which the point CO is set directly at Step 1009 of thus routine.

Furthermore, regarding displaying a pattern element on the CRT 8, the coordinates of each stitching point is calculated individually in this embodiment for the effective utilization of the memory area, however, it is also possible to achieve the translation of the pattern element, depending on the capacity of the CPU and the capacity of the storage area, by storing the data normalized at Step 1011 in another storage area and by adding a constant to or subtracting a constant from all the data. This processing method enhances the processing speed, however, an appropriate processing method may be selected taking the ability of the system into account, since the enhancement of the processing speed requires an increased storage area.

Figure 24:
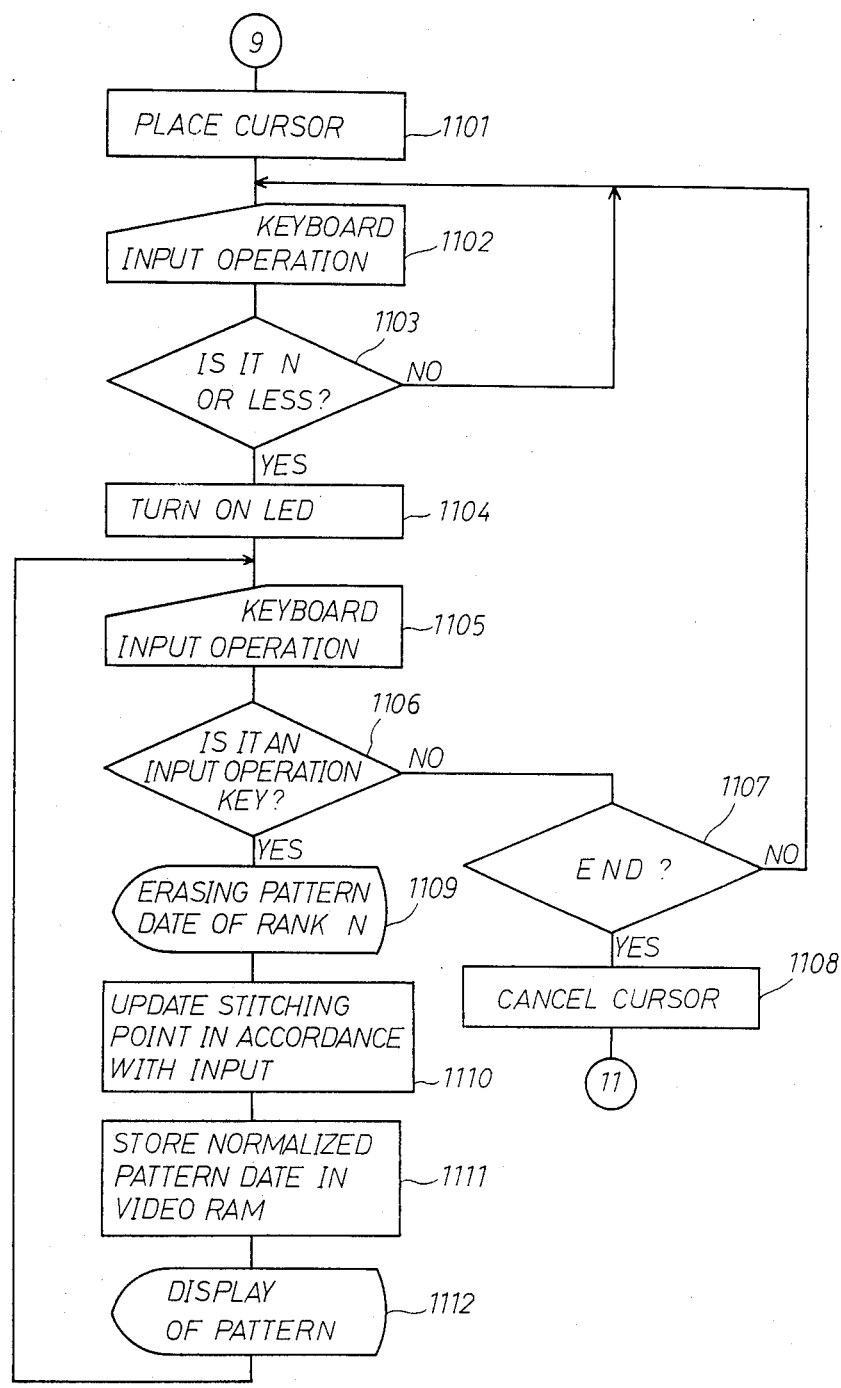
FIG. 24 is a flow chart of a character turning routine.

FIG. 24 shows a flow chart of a "Character rotation" routine which is selected at Step 310 of the main routine.

At Step 1101, the cursor is placed at the head of indication "Rotate" provided on the CRT 8 representing this routine in an abbreviated form to indicate the readiness of the control system for the execution of this routine.

At Step 1102, keyboard input operation is waited for an when any keyboard input is given, the procedure goes to Step 1103.

At Step 1103, the keyboard input is examined to decide if the keyboard input is an input indicating the rank N attached to the pattern element shown in FIG. 19. If not, the procedure is returned to Step 1102 requiring the repetition of the operation of Step 1102. If so, the next Step 1104 is executed to turn on the LED 7e shown in FIG. 5. In this case, since only the operation keys for pattern rotation are designated, only the LED indicating a pair of keys with arrow on the upper right-hand corner of FIG. 5 is turned on. At the next Step 1105, keyboard input is waited for and when the operation key or some key is operated, the procedure goes to Step 1106.

At Step 1106, the keyboard input is examined to decide if the keyboard input is given by means of the operation key, i.e., the key with arrow. If so, the procedure goes to Step 1109 and if not, to Step 1107.

At Step 1107, decision if this routine is to be ended is made. When the END key was operated at Step 1105, Step 1108 is executed to cancel the cursor indicated at Step 1101 and to turn off the LED turned on at Step 1104. Then, the procedure goes to the main routine 11. If the keyboard input was made by means of a key other other than the END key, the keyboard input is decided to be a false input and the procedure is returned to Step 1102.

Step 1109 is executed when an input is given by means of the operation key as mentioned earlier to erase the pattern of rank N which was given at Step 1102 from the CRT 8. That is, the data obtained by normalizing the pattern data of rank N stored in the RAM 12 and stored in the video RAM 17 is cleared.

Figure 25:
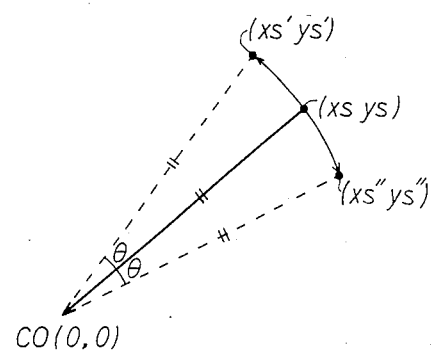
FIG. 25 is an explanetory view of character turning.

At the next Step 1110, the data of stitching points among the pattern data attached with rank N and stored in the RAM 12 is updated on the basis of the reference point CO in accordance with the operation either of the operation key with the arrow " ↓ " or of the operation key with the arrow " ↓ ". For instance, the coordinates (xs,ys) of each stitching point are updated to coordinate (xs', ys') by turning the coordinates (xsl, ys) in a counterclockwise direction through an angle $\theta$ about the point CO as shown in FIG. 25 when the key with the arrow " ↓ " is operated or to coordinates (xs", ys") by turning the coordinates (xs, ys) in a clockwise direction through an angle $\theta$ about the point CO when the key with the arrow " ↓ " is operated. This angle $\theta$ is a predetermined constant of the control system.

As Step 1111, the updated pattern data of the rank N is normalized for display on the CRT 8 and the normalized updated pattern data is stored in the video RAM 17. At Step 1112, the RT controller 16 makes the CRT 8 display the data stored in the video RAM 17.

The Steps 1104 through 1112 are executed successively. Therefore, the pattern element can be turned successively stepwise by the angle at a time when the key with the arrow " ↑ " or " ↓ " is kept depressed. The data stored in the RAM 12 is updated at each turning of the pattern element.

Figure 26:
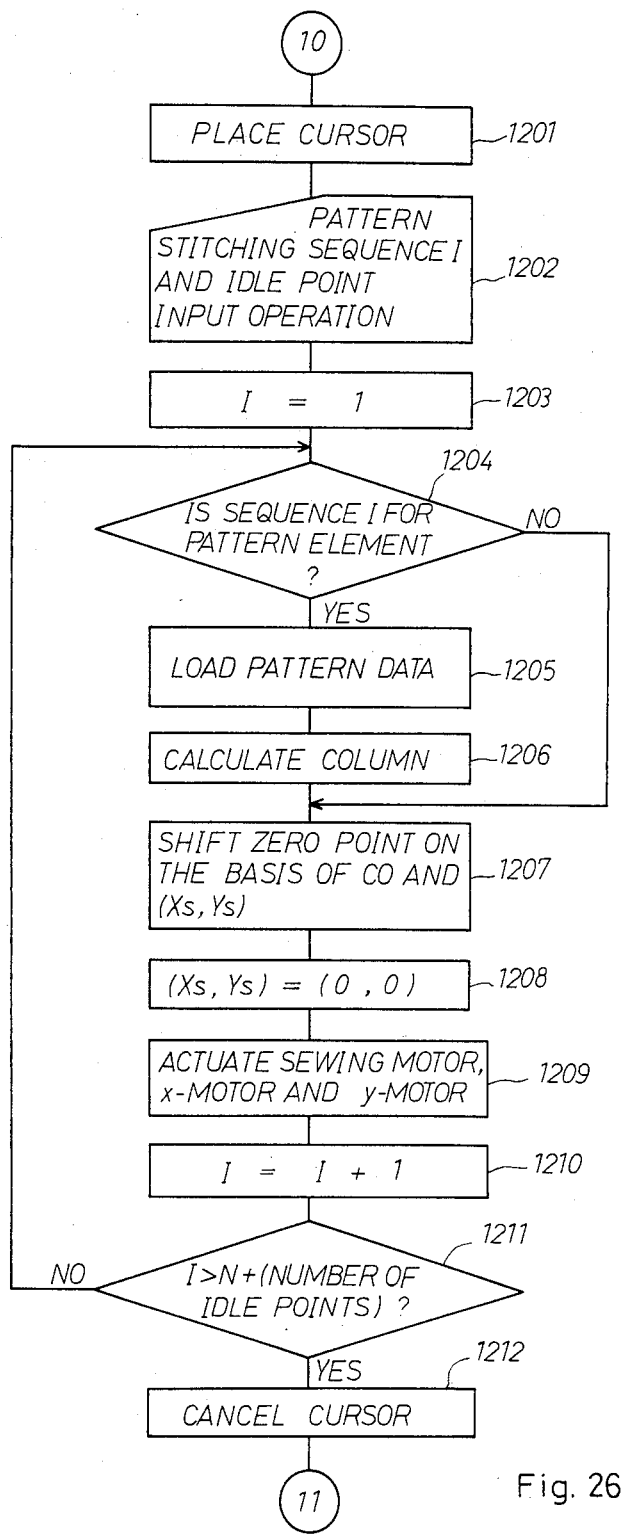
FIG. 26 is a flow chart of a stitching routine.

FIG. 26 shows a flow chart of a "Stitching" routine selected at Step 311 of the main routine. This routine is executed to form a pattern consisting of pattern elements created previously on the display area 8b on a fabric.

At Step 1201, the cursor is placed at the head of an indication "Stitch" on the CRT 8 to indicate the readiness of the control system for the execution of this routine.

Figure 27:
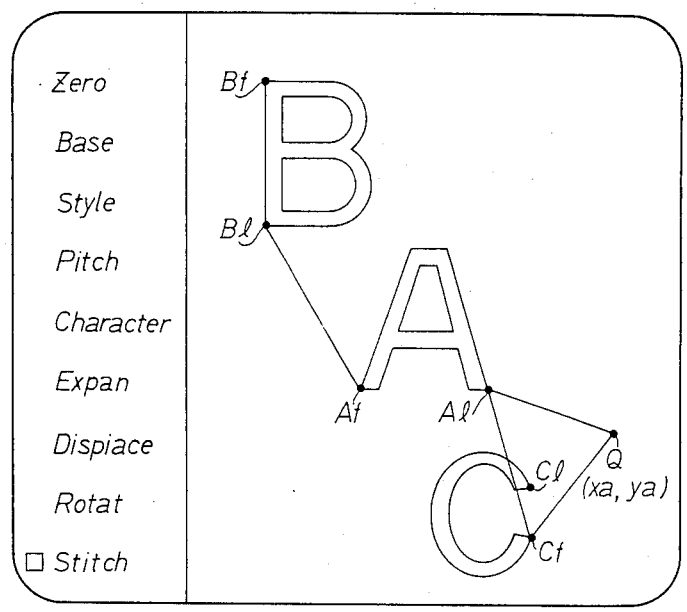
FIG. 27 is an explanetory illustration f the stitching routine.

At Step 1202, the sequence of pattern elements to be stitched on the fabric by the sewing machine 1 is given when a plurality of pattern elements (the rank N is greater than one) are to be stitched through the execution of this routine, information if it is necessary to stitch points having no connection with the pattern to be stitched (designated as "idle points" hereinafter) by the stitching action of the stitching needle 1' between the completion of stitching one pattern element and the start of stitching the next pattern element and, when it is necessary to stitch idle points, the coordinates (xa, ya) of each idle point (coordinates on the imaginary Catesian coordinate system on the CRT 8 as shown in FIG. 15) and the timing of stitching each idle point are given as input information to the control system. For instance suppose that in stitching a pattern consisting of three English letters A, B and C as shown in FIG. 27, stitching is performed from the starting point Bf to the last point Bl of the letter B, then from the starting point Af to the last point Al of the letter A, and then from the starting point Cf to the last point Cl of the letter C. When the stitching needle 1' is shifted to the starting point Af of the letter A after the completion of the stitching of the letter B, the stitching yarn carried by the stitching needle 1' extends between the last point Bl of the letter B and the starting point Af of the letter A. Similarly, when the stitching needle 1' is shifted from the letter A to the letter C, the stitching yearn extends between the last point Al of the letter A and the starting point Cf of the letter C. As regards the yearns extending between the letters, the yearn extending between the points Bl and Af have nothing at all to do with stitching those three letters, whereas the yearn extending between the points Al and Cf is buried beneath the yearn forming the letter C when the letter C is stitched and the removal of the year buried beneath the stitched is practically impossible. Therefore, the pattern element stitching sequence needs to be changed or the stitching operation of the sewing machine needs to be interrupted after the completion of the stitching of every pattern element to remove the yearn extending between the last point of the preceding pattern element and the starting point of the succeeding pattern element.

Accordingly, idle points are provided to obviate the above-mentioned inconvenience. In the case of FIG. 27, an idle point Q is provided. After completing the stitching of the letter A, the sewing machine 1 stitches the point Q, and then starts stitching the letter C.

Accordingly, in stitching the pattern shown in FIG. 27 by way of example, a stitching sequence of the letter B, the letter A, the point Q and the letter B, the letter A, the point Q and the letter C and the coordinates (xa, ya) of the point Q are fed into the control system at Step 1202.

At the Succeeding Step 1203, initialization is performed to set the sequence (variable I) at 1 (one).

At Step 1204, decision that the first stitching object is a pattern element or an idle point is made. If the first stitching object is an idle point, the procedure jumps tow Steps 1205 and 1206 and goes to Step 1207. If it is a pattern element, the procedure goes to Step 1205.

At Step 1205, the RAM 12 storing the pattern element designated by the sequence I and the stitching points and the coordinates of the reference point CO of the pattern element is read.

At Step 1206, the pattern element is divided into columns on the basis of the data read at Step 1205 and all the stitching points are calculated as explained in connection with FIGS. 8 to 11.

At Step 1207, zero adjustment is performed by controlling the x-motor 6x and the y-motor 6y of the driving unit to bring the reference point of the embroidery on the fabric into coincidence with the needle 1'. First power is supplied to the driving unit 6 in accordance with the zero data (Xs, Ys) which was described in connection with FIG. 12. This embodiment is capable of establishing two zero adjustment modes, namely, manual zero adjustment mode and automatic zero adjustment mode. In the manual zero adjustment mode, no power is supplied to the x-motor 6x and y-motor 6y, since the zero data (Xs, Ys) is (0, 0). In the automatic zero adjustment mode, the embroidery hoops 2' are moved automatically to a position right below the stitching needle 1' since the zero data (Xs, Ys) is (Nx, Ny) (data for controlling the x-motor 6x and the y-motor 6y so that the center of the embroidery hoops 2' located on a corner of the sewing table 5 is shifted to a position right below the stitching needle 1') Then, the data of the presently executed sequence I is the data of a pattern element, the x-motor 6x and the y-motor 6y are driven on the basis of the coordinates (xco, yco) of the reference point CO of the data of the pattern element and when the data of the presently executed sequence I is the data of an idle point, the x-motor 6x and the y-motor 6y are driven on the basis of the coordinates (xa, ya) of the idle point to decide the position of the fabric relative to the stitching needle 1', and then the procedure goes to Step 1208.

At Step 1208, initialization is performed to change the zero point from (Xs, Ys) to (0, 0). When the stitching sequence I is two or above, initialization is performed to perform stitching operation with the zero point of the same data as that of sequence 1.

At Step 1209, stitches are formed actually on the fabric. If the data of sequence I is the data of a pattern element, the x-motor 6x and the y-motor 6y are controlled on the basis of the data of all the stitching points calculated at Step 1206 and if the data of sequence I is the data of an idle point, the x-motor 6x and the y-motor 6y are controlled on the basis of the coordinates of the idle point, to move the fabric holding unit 2. Then a command is given to control the sewing motor 6s for stitching the stitching points or a stitching point by vertically reciprocating the stitching needle 1'.

At Step 1210, an increment is given to the stitching sequence I, that is, an increment of 1 is given to the present stitching sequence I (a variable). Then, the procedure goes to Step 1211.

At Step 1211, it is decided whether or not the sequence I has been ececuted for all the pattern data and the of the idle points by using an unequality: I>N+- (number of idle points). If the unequality is true, the procedure goes to Step 1212, where the cursor provided at Step 1201 is cancelled to indicate the end of this routine and the procedure is returned to the main routine 11. If the unequality is not true, the procedure is returned to Step 1204 of this routine to repeat the same control actions.

Figure 28:
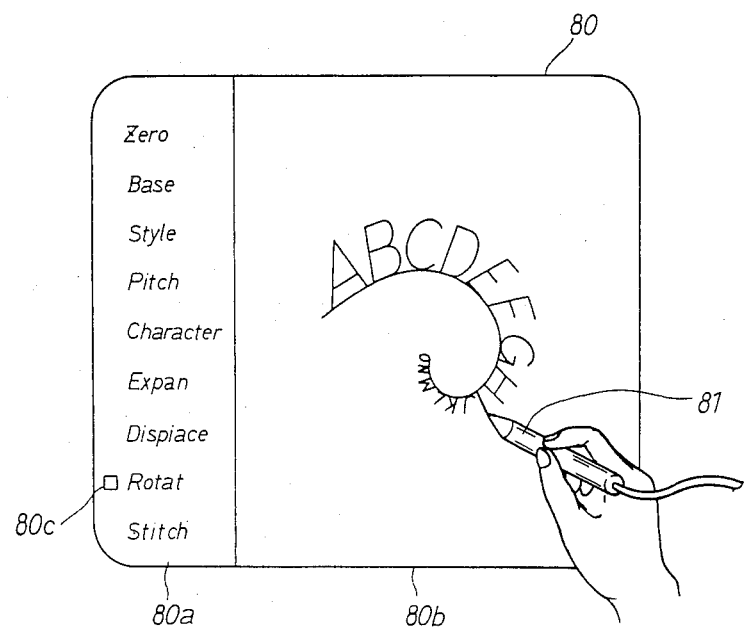
FIG. 28 is an explanatory illustration showing the manner of feeding information to the CRT 8 with a light pen.
Figure 29:
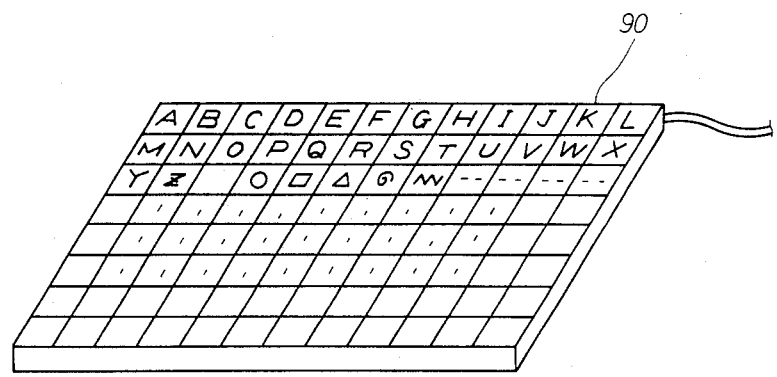
FIG. 29 is perspective view of a special input device.

Although the invention has been described as applied to a preferred embodiment thereof in which the coordinates of the idle point are given by means of the keyboard 7, it is also possible to use a well-known light pen as an input device in addition to the keyboard 7 as shown in FIG. 28 for the further functional improvement of the system. When a light pen is provided, the coordinates (xa, ya) of a necessary idle point and the statching points immediately before and immediately after the idle point (stitching points Al and Cf in FIG. 27) are indicated with the light pen so that the system is able to decide after which pattern element and before which patter element the idle point is to be stitched. the use of a light pen also enable the highly free creation of patterns. The use of a special push-button input device 90 as shown in FIG. 29 will improve the efficiency of data input operation.

From the foregoing description of a preferred embodiment of the present invention in terms of its constitution and actions, it is readily appreciated that a two-dimensional pattern to be displayed on the CRT 8 is produced by combining aesthetic pattern elements which have previously been prepared and the location on the CRT, the size and the angular position of those pattern elements can freely and selectively be changed. Accordingly, a desired creative pattern can readily be displayed visually on the a CRT 8. The pattern displayed on the CRT 8 is processed properly by the microprocessor 9 and the sewing machine 1 and the driving unit 6 are controlled in accordance with the output control signals given by the microprocessor 9 so that practically the same pattern as shown on the CRTZ 8 is formed automatically on a fabric. Accordingly, the created pattern can simply be fed into the control system without requiring complicated procedure such as coding and the pattern to be formed actually on the fabric after the completion of a series of actions of the control system can be recognized beforehand on the CRT 8. Furthermore, the two-dimensional display of a pattern imaged by the operator on the CRT 8 enables the recognition of the imaged pattern on the same dimension as the dimension of the actual pattern, therefore, time and skill for recognizing the imaged pattern are unnecessary, hence any person, either skilled or not skilled, is able to create patterns simply and to form the created pattern on a fabric.

Although the invention has been described as applied to an embroidery machine equipped with a single sewing head, the present invention is applicable also to an embroidery machine equipped with multiple sewing heads and capable of forming each pattern element by yearns of various colors. In an embroidery machine equipped with multiple sewing heads, the data (Xs, Ys) for zero adjustment shown in FIG. 13 is set for each sewing head and the zero point of each sewing head is moved to the origin of the Cartesian coordinate system on the CRT 8. Therefore the zero point of each sewing head need not be changed at all as all the pattern data is defined with respect to the origin of the Cartesian coordinate system.

Still further, additional functions to display a pattern element stored in the character pattern ROM 13b on the CRT 8 in association with a geometric pattern displayed on the CRT 8 by processing the geometric pattern data stored in the reference ROM 13a at a tilted position corresponding to the curvature of the geometric pattern by calculating the curvature and the relevant tangent to the geometric pattern at a specific point thereon, such as to display the pattern element on the calculated tangent by defining the angle of rotation of the pattern element, and providing the subroutines of the main routine shown in FIG. 12 with editing function are readily achievable through the utilization of well-known computer graphic technology. Even in the application of the present invention in combination with such well-known computer graphic technology, the present invention is not subject to any change and is capable of correctly forming practically the same pattern as that displayed on the CRT 8 on a fabric.

Furthermore, the magnetic disk memory 20, included in the control system according to the present invention, is capable of storing patterns displayed on the CRT 8. Accordingly, patterns can simply be corrected on the basis of the patterns stored in the magnetic disk memory 20. The printer 21 also included in the control system according to the present invention is capable of printing patterns before stitching the same and the copies of the printed patterns can be used as means of information.

What is claimed is:

1. An embroidery machine comprising:
   stitch forming means for forming stitches on a fabric;
   a fabric holding means which holds said fabric with embroidery hoops and moves on a plurality of rails provided on a sewing table;
   driving means having a driving unit using the driving force of the sewing motor for vertically reciprocating the stitch forming means, a first moving means for moving the fabric holding unit along one of said rails and a second moving means for moving the fabric holding unit along the other rail;
   pattern determining means comprising a CPU (Central Processing Unit), a ROM (read-only Memory) which stores a control program defining a series of control procedures to be executed by the CPU, a random access storage which stores temporarily the results of various operations performed by the CPU, a basic ROM, which previously stores a plurality of geometric patterns formed by straight lines and curves to be selected in accordance with input signals given by means of the keyboard, a character pattern ROM, which stores block letters, Gothic letters and English capital letters, a video RAM which reads and stores the information of determined patterns at predetermined addresses thereof, and a CRT controller (Cathode-Ray Tube controller) which controls a CRT to display the contents of the video RAM in accordance with the commands given by the CPU; and means for displaying on the CRT a pattern, two-dimensionally and an input unit for feeding a pattern element to be displayed on the CRT, a keyboard which functions as an input unit with which a pattern is created and control signals based on the created pattern are fed into the control system and a cathode-ray tube, namely, a two-dimensional display unit, which visually displays a pattern which is substantially the same as a pattern created by operating the keyboard and to be formed actually on the fabric when a pattern is created or the created pattern is changed or corrected in accordance with the input information given by means of the keyboard;

wherein said keyboard includes function keys for facilitating numeric input operation, operation keys each marked with a specific arrow symbolizing the operation of the control system and LEDs (Light Emission Diodes) which are turned on for the visual indication of permission to perform the input operation of the operation keys; and wherein said microprocessor includes zero adjustment means, base indicating means, character style selecting means, pattern element selecting means, pattern element rotating means and stitching means which are executed in accordance with said control programs; and each said means includes means to be processed by means of the CRT and the keyboard; and a motor controller including an x-y motor controller which controls stepping motors properly for the normal or the reverse rotation in accordance with commands given by the CPU to move the fabric holding means and a sewing motor controller which controls the sewing motor in accordance with commands given by the CPU to reciprocate the stitching means vertcially.

2. An embroidery machine according to claim 1, wherein said zero adjustment means includes means to indicate an automatic zero adjustment mode or a manual zero adjustment mode and means to cancel the indication of the automatic or manual zero adjustment.

3. An embroidery machine according to claim 1, wherein a reference indicating means includes means to display a pattern by means of luminous elements among the elements of a matrix of m lines and n rows of elements with respect to the center of the pattern display section as a new origin, means to select a basic pattern stored in the basic ROM, means to normalize a selected basic pattern and store the normalized basic pattern in the video RAM as data representing the corresponding elements of the matrix and means to make the elements of the matrix corresponding to the data luminous.

4. An embroidery machine according to claim 3, wherein said character style selecting means includes means to select a character pattern ROM corresponding to keyboard input information.

5. An embroidery machine according to claim 3, wherein said pattern element rotating means includes means to give an angle of rotation about the reference point and means to rotate the pattern element and to display the rotated pattern element on the CRT.

6. An embroidery machine according to claim 3, wherein said stitching means includes means to display the condition of interference between a line interconnecting the last stitching point of a preceding pattern element and the first stitching point of the succeeding pattern element.

7. An embroidery machine according to claim 6, wherein said stitching means includes means to provide an idle point having no connection with the pattern between the last stitching point of a pattern element and the first stitching point of the succeeding pattern element and to insert an idle point stitching sequence into the pattern stitching sequence.

8. An embroidery machine according to claim 1, wherein an auxiliary storage for storing the information stored in said video RAM is provided.

9. An embroidery machine according to claim 1, wherein a printer for printing the information stored in the video RAM is provided.

* * * * *